United States Patent
Hosick et al.

(10) Patent No.: US 12,365,283 B2
(45) Date of Patent: Jul. 22, 2025

(54) SEARCHLIGHT SYSTEM FOR VEHICLE POST

(71) Applicant: Golight, Inc., Culbertson, NE (US)

(72) Inventors: Colton D. Hosick, Culbertson, NE (US); Bruce Bair, Culbertson, NE (US); Albert W. Gebhard, Denver, CO (US); Gerald L. Gohl, Culbertson, NE (US)

(73) Assignee: Golight, Inc., Culbertson, NE (US)

( * ) Notice: Subject to any disclaimer, the term of this patent is extended or adjusted under 35 U.S.C. 154(b) by 0 days.

(21) Appl. No.: 18/586,335

(22) Filed: Feb. 23, 2024

(65) Prior Publication Data

US 2024/0198894 A1    Jun. 20, 2024

Related U.S. Application Data

(63) Continuation-in-part of application No. 17/099,147, filed on Nov. 16, 2020, now Pat. No. 11,938,859.
(Continued)

(51) Int. Cl.
*B60Q 1/24* (2006.01)
*B60Q 1/00* (2006.01)
(Continued)

(52) U.S. Cl.
CPC .......... *B60Q 1/245* (2013.01); *B60Q 1/0023* (2013.01); *B60Q 1/0035* (2013.01); *F16M 11/126* (2013.01); *F21V 21/14* (2013.01); *F21V 21/26* (2013.01); *F21V 21/28* (2013.01); *F21V 21/30* (2013.01)

(58) Field of Classification Search
CPC .......... F21V 21/14; F21V 21/26; F21V 21/28; F21V 21/30; B60Q 1/245; F16M 11/126
See application file for complete search history.

(56) References Cited

U.S. PATENT DOCUMENTS

| | | | |
|---|---|---|---|
| 3,307,029 A | 2/1967 | Gross | |
| 4,419,721 A | 12/1983 | Gregoire | |

(Continued)

FOREIGN PATENT DOCUMENTS

| | | | | |
|---|---|---|---|---|
| CN | 111022974 A | * | 4/2020 | |
| WO | WO-2014172346 A1 | * | 10/2014 | ........... F16M 11/125 |

OTHER PUBLICATIONS

Machine translation of CN 111022974 A retrieved from the FIT database of PE2E search. (Year: 2025).*
(Continued)

*Primary Examiner* — Colin J Cattanach
(74) *Attorney, Agent, or Firm* — Polson Intellectual Property Law P.C.; Margaret Polson; Christopher Sylvain

(57) ABSTRACT

A searchlight system for mounting to a vehicle, for example on the A-pillar, without requiring modification to structural frame components. The system comprises a mounting assembly which is installed on the vehicle and a searchlight assembly which is mounted to the mounting assembly. Searchlight assemblies with different optical devices can be modularly exchanged with respect to the same mounting assembly installed on the vehicle. Also disclosed is a method for installing such systems. Other aspects are directed to heat dissipation and ingress protection for the searchlight assembly, as well as a pan-tilt mechanism with symmetrical drivetrains.

15 Claims, 31 Drawing Sheets

Related U.S. Application Data

(60) Provisional application No. 62/935,734, filed on Nov. 15, 2019.

(51) Int. Cl.
*F16M 11/12* (2006.01)
*F21V 21/14* (2006.01)
*F21V 21/26* (2006.01)
*F21V 21/28* (2006.01)
*F21V 21/30* (2006.01)

(56) References Cited

U.S. PATENT DOCUMENTS

| | | |
|---|---|---|
| 4,890,207 A | 12/1989 | Jones |
| 5,386,350 A | 1/1995 | Gross |
| 5,490,046 A | 2/1996 | Gohl |
| 5,673,989 A | 10/1997 | Gohl |
| 6,461,009 B2 | 10/2002 | Smith |
| 6,786,622 B1 | 9/2004 | Rice |
| 6,789,912 B2 | 9/2004 | Smith |
| 6,955,447 B2 | 10/2005 | Lui |
| 7,029,057 B2 | 4/2006 | Izabel |
| D551,786 S | 9/2007 | Smith |
| D573,286 S | 7/2008 | Zettl |
| 7,733,370 B2 | 6/2010 | Werth |
| 7,862,197 B2 | 1/2011 | Gebhard |
| 8,596,836 B2 | 12/2013 | Pedersen |
| 8,708,535 B2 | 4/2014 | Dalsgaard |
| 9,255,687 B2 | 2/2016 | Gebhard |
| 9,381,870 B2 | 7/2016 | Jordan |
| 9,403,492 B1 | 8/2016 | Greggs |
| 9,539,952 B2 | 1/2017 | Gebhard |
| 10,775,029 B2 | 9/2020 | Sousa |
| 11,168,874 B2 | 11/2021 | Sousa |
| 11,225,290 B2 | 1/2022 | Holyroyd |
| 11,433,844 B2 | 9/2022 | Dhruna |
| 11,453,351 B1 | 9/2022 | Triplett |
| 11,938,859 B2 | 3/2024 | Hosick |
| 2006/0232985 A1 | 10/2006 | Wang |
| 2008/0043098 A1 | 2/2008 | Leblanc |
| 2013/0058120 A1 | 3/2013 | Schütz |
| 2013/0319962 A1 | 12/2013 | Park |
| 2019/0275952 A1 | 9/2019 | Bennett |
| 2021/0239303 A1 | 8/2021 | Sousa |
| 2022/0080892 A1 | 3/2022 | Whipps |
| 2023/0144329 A1 | 5/2023 | Gough |

OTHER PUBLICATIONS

Pending U.S. Appl. No. 29/849,560, filed Aug. 11, 2022 (Hosick et al.) by applicant Golight, Inc. [Copy not provided per MPEP 609.04(a)(II) since available in the USPTO electronic system].

Pending U.S. Appl. No. 29/929,765, filed Feb. 23, 2024 (Hosick et al.) by applicant Golight, Inc. [Copy not provided per MPEP 609.04(a)(II) since available in the USPTO electronic system].

Pending U.S. Appl. No. 18/616,820, filed Mar. 26, 2024 (Hosick et al.) by applicant Golight, Inc. [Copy not provided per MPEP 609.04(a)(II) since available in the USPTO electronic system].

* cited by examiner

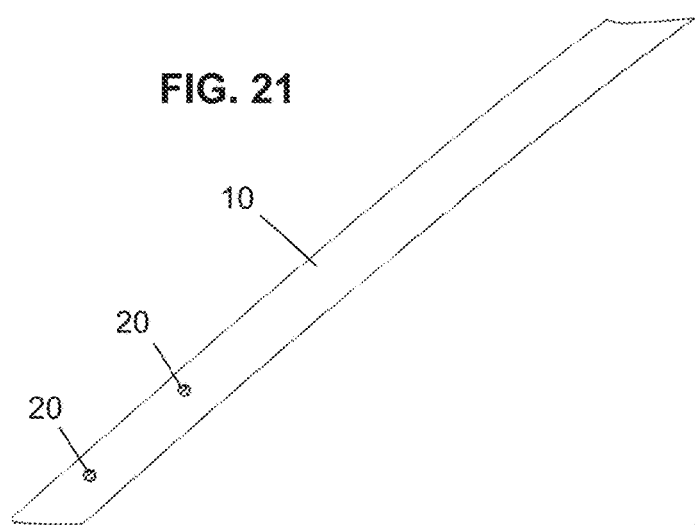
FIG. 21
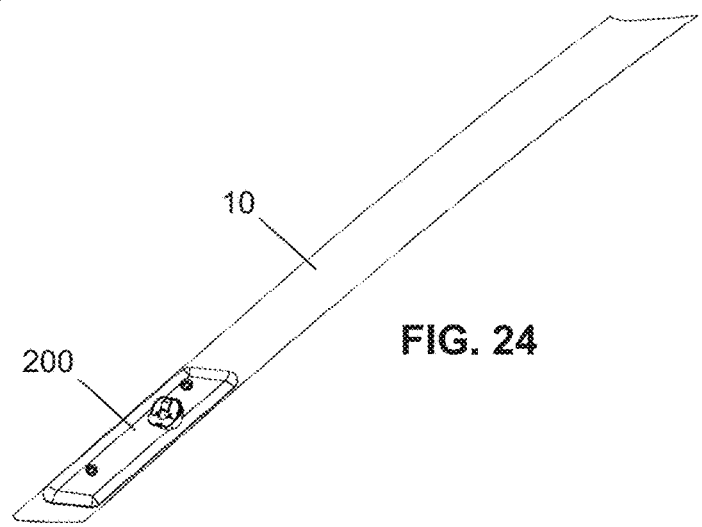
FIG. 24
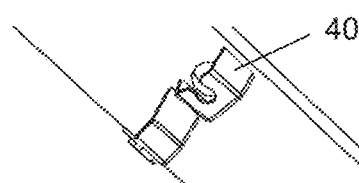
FIG. 23
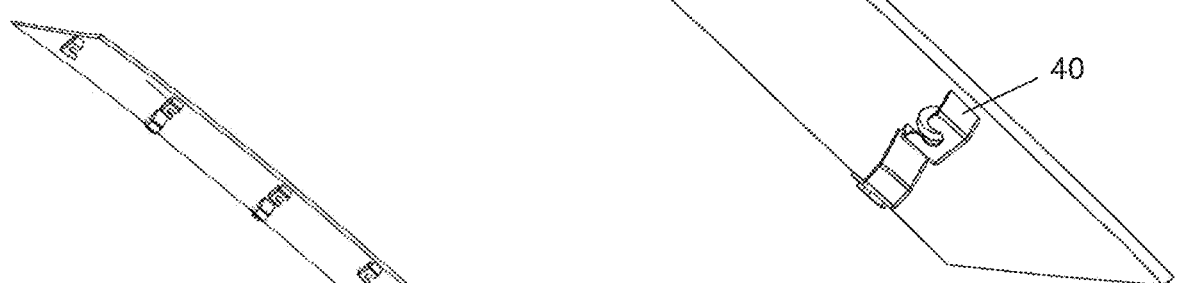
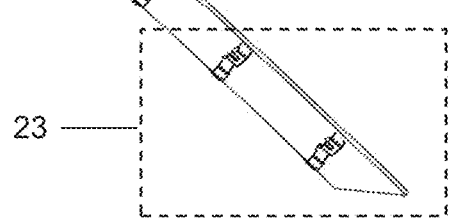
FIG. 22

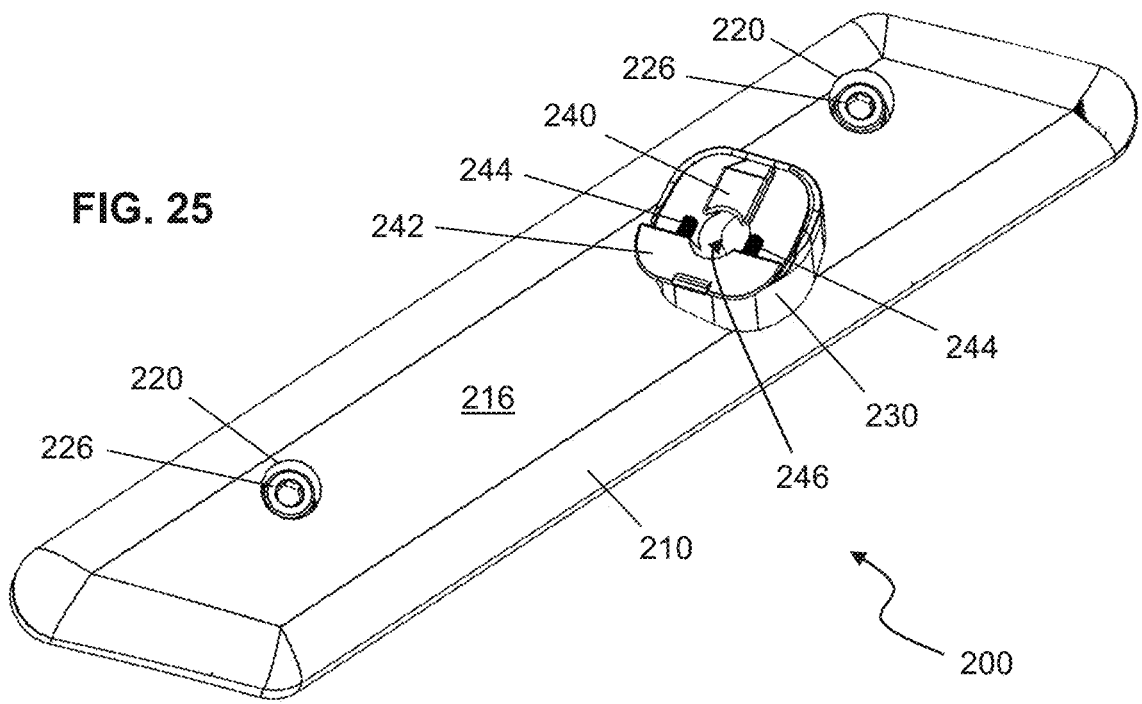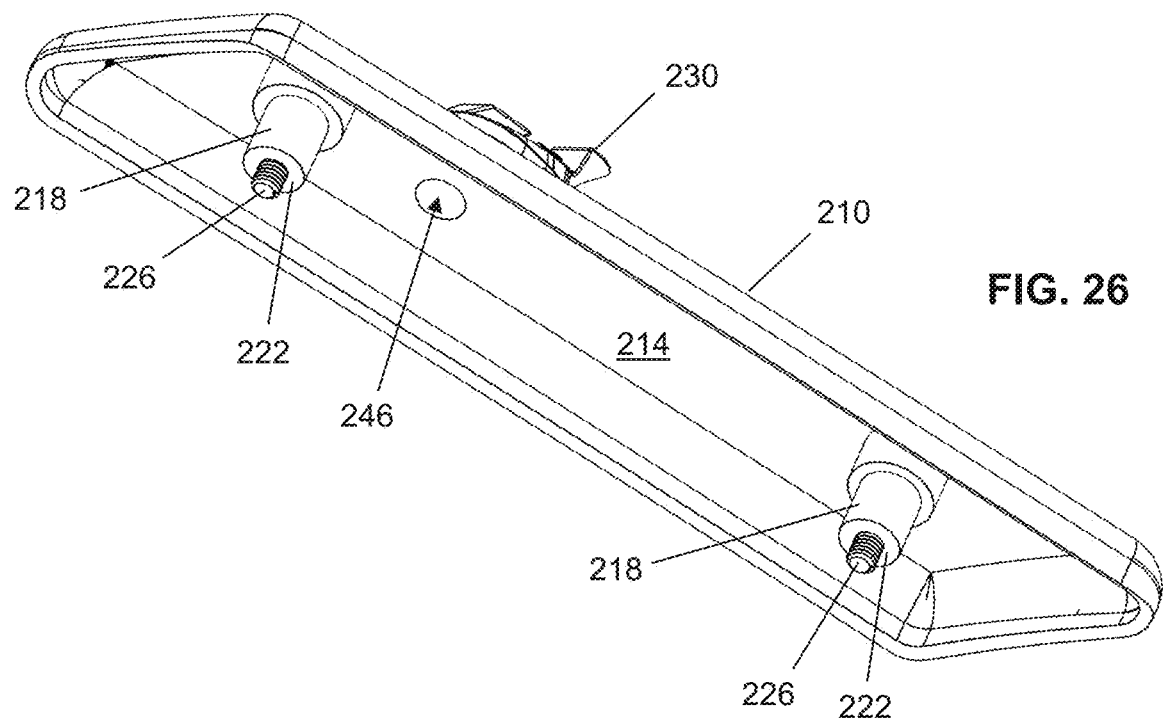

SEARCHLIGHT SYSTEM FOR VEHICLE POST

RELATED APPLICATIONS

This application claims the benefit of application Ser. No. 17/099,147 filed Nov. 16, 2020 and application No. 62/935,734 filed Nov. 15, 2019, which are incorporated-by-reference herein.

BACKGROUND

It can be desirable to mount a spotlight or searchlight to the post or pillar of a vehicle frame. For example, searchlights mounted to the A-pillar of an automobile are commonly used in law enforcement. However, many pillar-mounted searchlight systems are invasive, with installation requiring holes be drilled into and through the pillar of the vehicle body. For example, steering rods of handle-operated spotlights may extend from the interior passenger cabin through the vehicle frame post to the exteriorly-mounted spotlight. Such invasive configurations can potentially weaken the structural integrity of the pillar, which may negatively affect the pillar's crush performance in an impact event such as a rollover and thus present a safety risk. Such structural pillar modifications will also remain in the event that the searchlight system is to be uninstalled and no longer desired, thereby requiring repair in order to restore its pre-modification condition. Additionally, some searchlight mounting systems can involve a tedious process for dismounting and remounting the searchlight, for example during repair or replacement, and may not be readily compatible for use with other types of optical or sensor devices which can be advantageous depending on the user's circumstances.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above described problems have been reduced or eliminated, while other embodiments are directed to other improvements.

The present disclosure relates to a searchlight mounting system, including a mounting assembly and a searchlight assembly, and various aspects thereof, including a method for installing such a system to a vehicle. One aspect provides for the modular exchange of searchlights with respect to a mounting assembly installed on a vehicle. Another aspect provides for a mounting assembly to mount a searchlight to a vehicle with minimal or no structural modification to the A-pillar. Another aspect provides for a searchlight assembly with improved heat dissipation functionality. Another aspect is directed to ingress protection for a searchlight assembly having a head that is mounted to and rotatable relative to a pivot post. Another aspect relates to the design of the pan-tilt mechanism of the searchlight assembly.

In one embodiment for the modular exchange of searchlights, a searchlight mounting system comprises a mounting assembly and a searchlight assembly. The mounting assembly includes at least one bracket and an adapter, with the at least one bracket having an interior surface and an exterior surface opposite the interior surface, and the adapter projecting out from the exterior surface of the at least one bracket. The searchlight assembly includes a support arm/base portion and a head portion rotatably mounted with respect to the support arm, with the head carrying an optical or sensor device, and the support arm configured to attach to the adapter. The adapter comprises a first projection and a second projection which are arranged opposite the exterior surface, with a cross-sectional geometry of the first projection becoming wider as the first projection extends away from the adapter. The support arm comprises two corresponding projections at one end. The two projections of the support arm are spaced apart from each other to form a channel therebetween which is shaped to receive the first projection of the adapter. A cross-sectional geometry of this channel becomes narrower as the two projections extend away from the support arm. For example, the cross-sectional geometry of the first projection of the adapter may be trapezoidal in shape, with facing walls of the two projections of the support arm angled inward toward each other in extending away from the support arm to correspond to the trapezoidal shape of the first projection of the adapter. In this way, the first projection of the adapter and the two projections of the support arm may interface to form a dovetail joint. The second projection of the adapter may further comprise two bores configured to receive fasteners, with each bore of the second projection configured to align with a respective fastener mating bore formed in each of the two projections of the support arm. For wired embodiments, the support arm may comprise an internal conduit which aligns with an internal conduit of the adapter, when the support arm is mounted on the adapter, for running wiring from the searchlight assembly through the adapter. The first projection of the adapter may be positioned vertically higher than the second projection of the adapter when the mounting assembly is mounted to a vehicle, such that the searchlight assembly is downwardly slidable onto adapter of the mounting assembly.

In one embodiment for mounting a searchlight to a vehicle with minimal or no structural modification to the A-pillar, a mounting assembly comprises at least one bracket and an adapter. The bracket has an interior surface opposite an exterior surface, with the interior surface configured to face toward the vehicle when installed. The adapter projects out from the exterior surface of the bracket and is configured to attach to the searchlight. The bracket comprises fastener openings that extend between the exterior surface and the interior surface. Preferably, the fastener openings are counterbores or countersinks, with a first bore on the exterior surface side being larger in diameter than a second bore on the interior surface side. According to some embodiments, the bracket comprises projections which extend out from the interior surface, with the first bore formed into each projection from the exterior surface. Each projection has an end wall opposite the interior surface with the second bore formed through the end wall. Fasteners having a head and a shank insert into the fastener openings. The head is larger in diameter than the second bore, while the shank is smaller in diameter than the second bore. Openings are formed in a trim cover, or vehicle surface of the outermost component of the A-pillar structure, of the vehicle. Otherwise, no structural modification of the strong underlying A-pillar frame of the vehicle is necessary such that crash performance requirements are not compromised. The bracket projections may or may not extend through the openings formed in the vehicle surface depending on the embodiment. During installation of the mounting assembly onto the A-pillar, fasteners are inserted into the first bore at the exterior surface of the at least one bracket and through the second bore. The fasteners are anchored into either existing fastener mating holes of the A-pillar or into nuts, such as clip nuts or rivet nuts, whereby the fasteners are then tightened to secure the bracket to the vehicle surface. In particular, the fastener head is tightened against a contact surface which faces away from the vehicle surface and surrounds the second bore, such as the contact surface provided by the end walls of the projections for example. The clip nuts, as part of the mounting assembly, are positioned underneath the vehicle surface and receive the shanks of the fasteners. For example, the clips nuts may be mounted onto a metal base piece of the vehicle between the pillar and trim piece, such as in vehicles having such a base piece welded onto the A-pillar for attachment of the trim piece thereon. The rivet nuts, as part of the mounting assembly, are placed in the openings formed in the vehicle surface and fixed thereon using an installation tool. For example, the installation tool may collapse the threaded nut body against the blind side of the vehicle surface to create a material bulge securing the rivet nut to the vehicle surface. The at least one bracket may comprise a shell construction with the interior surface defining a cavity for running wiring from the searchlight to the vehicle. For example, the adapter may have an internal conduit for running wiring from the searchlight to the cavity defined by the interior surface of the at least one bracket. The at least one bracket may extend along the A-pillar down to a windshield cowling area of the vehicle. In some embodiments, the adapter is a separate component secured to the bracket. For example, the interior surface of the bracket may comprise an interface surface adjacent a bracket opening therethrough, with the adapter having a mounting collar with a wider geometry than the rest of the adapter and bracket opening, such that the adapter extends through the bracket opening in projecting out from the exterior bracket surface, and the mounting collar of the adapter is coupled to the interface bracket surface. In which case, the mounting collar and/or the interface surface may include a collar conduit for running wiring across the mounting collar. In some embodiments, the at least one bracket comprises an upper bracket and a lower bracket, and the adapter projects out from the exterior surface of the upper bracket. In some embodiments, the at least one bracket and the adapter are formed together as a single component. Such a single-piece construction of the bracket and adapter may or may not have a separate lower bracket depending on the embodiment. Preferably, a gasket covers the bracket portions that contact the pillar surface.

In one embodiment directed to heat exchange, a searchlight assembly comprises a head portion including at least one housing shell, a heat sink, a heat sink ring gasket, and an optical device. The at least one housing shell houses one or more internal components of the head, and the heat sink is coupled to the at least one housing shell. The heat sink comprises a heat sink ring having a first mating surface, a second mating surface opposite the first mating surface, and an exterior surface extending between the two mating surfaces. The heat sink ring gasket is positioned between the first mating surface and the at least one housing shell to provide a water-resistant seal therebetween. An outer surface of the head is formed, at least in part, by the exterior surface of the heat sink ring and the at least one housing shell. The outer surface of the head is exposed to an outside environment, whereby the heat sink ring is in direct thermal communication with the outside environment. It is preferable that the heat sink be made of a material with high thermal conductivity. For example, the heat sink may be made of aluminum. The at least one housing shell may generally be made of a molded material, such as plastic or aluminum. The heat sink may further comprise a plurality of cooling fins facing the internal components of the head within the at least one shell. A bezel may be provided which abuts the second mating surface of the heat sink ring, and configured to outwardly secure an optical device within the head. The heat sink ring may be coupled to the at least one housing shell via fasteners which extend through the heat sink ring and mate into bosses of the at least one housing. In some embodiments, the fasteners couple the bezel to the second mating surface of the heat sink ring as well.

In another embodiment directed to ingress protection, the searchlight assembly comprises a head portion and a pivot post/yoke portion. The head includes an optical device, at least one housing shell, and at least one internal housing insert. The pivot post at least partially extends into the head. The head is mounted to the pivot post in a vertically pivotable manner whereby a lower edge of the at least one housing shell is spaced apart from the pivot post for clearance space. The at least one housing shell houses one or more internal components of the head. An internal housing surface of the housing shell comprises insert piece fittings which project from the internal housing surface. The insert piece fittings are shaped to receive and retain the internal housing insert. The internal housing insert is positioned within the insert piece fittings and interfaces with the internal housing surface, whereby the at least one internal housing insert completes a physical partition between the pivot post within the head and the one or more internal components of the head. Both the at least one housing shell and the at least one internal housing insert may be made of a molded material, such as plastic or aluminum. In some embodiments, sealant or adhesive is provided along contact points between the housing shell(s) and the internal housing insert(s). One or more rubber or elastomer seals may also be provided along contact points between the housing shell(s) and the internal housing insert(s). In some embodiments, the head further comprises at least one cradle structure for mounting the one or more internal components of the head, and the at least one internal housing insert interfaces with the at least one cradle structure in completing the physical partition. In which case, sealant or adhesive may be provided along contact points between the cradle structure(s) and the internal housing insert(s) as well. One or more rubber or elastomer seals may also be provided along contact points between the cradle structure(s) and the internal housing insert(s). In some embodiments, the at least one internal housing insert comprises two internal housing inserts, and the two housing inserts interface with each other in completing the physical partition. Again, sealant or adhesive may be provided along contact points between the two housing inserts. Likewise, one or more rubber or elastomer seals may also be provided along contact points between the two housing inserts.

Accordingly, a method for installing a searchlight system to a vehicle may comprise the steps of: forming openings in an exterior vehicle surface of a pillar of the vehicle; arranging a mounting assembly of the searchlight system on the vehicle surface, the mounting assembly comprising a mounting bracket having fastener openings, preferably counterbores or countersinks, which extend between an exterior surface of the mounting bracket and an interior surface of the mounting bracket, wherein the interior surface faces the vehicle surface when the mounting bracket is arranged thereon; securing the mounting bracket to the vehicle surface by tightening fasteners inserted into the counterbores or countersinks from the exterior surface of the mounting bracket, whereby the fasteners are anchored with respect to the vehicle surface by threaded holes or nuts, such as fastener mating holes of the pillar, clip nuts underneath the vehicle surface, and/or rivet nuts installed in the openings of the vehicle surface; and mounting a searchlight assembly to the mounting bracket, wherein an adapter projects from the exterior surface of the mounting bracket, and the searchlight assembly is configured to removably couple to the adapter. The counterbores or countersinks may be formed through projections which project from the interior surface of the mounting bracket. According to some embodiments, the projections are inserted through the openings of the vehicle surface when the mounting bracket is arranged thereon. In some embodiments, the mounting bracket comprises a shell construction defining a cavity, and after the step of securing the mounting bracket to the vehicle surface, wiring is run from the searchlight assembly through the adapter of the mounting bracket and into the cavity which is formed between the vehicle surface and the interior surface of the mounting bracket. In which case, the wiring may then be run from the cavity between the vehicle surface and mounting bracket to a windshield cowling area of the vehicle and then through into the interior cabin of the vehicle. In some embodiments, the mounting bracket comprises an upper mounting bracket and a lower mounting bracket, with the upper mounting bracket carrying the adapter, and the upper mounting bracket being secured to the vehicle surface before the lower mounting bracket is secured to the vehicle surface. In which case, the lower mounting bracket may be arranged between the upper mounting bracket and the windshield cowling area of the vehicle, and wiring run from the searchlight assembly through the upper bracket and into the interior cabin of the vehicle before the lower mounting bracket is secured to the vehicle surface. In some embodiments, during the step of mounting the searchlight assembly to the mounting bracket, the adapter of the mounting bracket and the searchlight assembly interface to form a dovetail joint. The searchlight assembly may also be slid downward onto the adapter of the mounting bracket. In some embodiments, fasteners used to secure the mounting bracket to the vehicle surface may be the original pillar fasteners that came with the vehicle. Where the fasteners are anchored into clip nuts, the clip nuts may be mounted onto a metal piece of the vehicle between the pillar and trim cover, for example, such as in vehicles having such a base piece welded onto the A-pillar for attachment of the trim cover thereon. Where the fasteners are anchored into rivet nuts, the rivet nuts may be fixed in the openings formed into the vehicle surface.

In another embodiment directed to the design of the pan-tilt mechanism, the searchlight assembly comprises a base portion, a post portion rotatably mounted to the base portion, a head portion pivotably mounted to the post portion opposite the base portion, and a pan/tilt mechanism. The post portion has a hollow interior with a transverse conduit extending therethrough. The post portion may have a T shape formed by a neck structure and a body structure. Preferably, the post portion comprises a vertical conduit extending therethrough with the stationary bevel gear also having a vertical conduit extending therethrough for wiring. The pan/tilt mechanism comprises a plurality of components including two reversible motors, two belts, two rotatable lower gears, two rotatable bevel gears, and a stationary bevel gear. The plurality of components form two symmetrical drivetrains of the pan/tilt mechanism. In each drivetrain of the two symmetrical drivetrains, a respective reversible motor is drivingly connected to a respective belt, the belt is drivingly connected to a respective lower gear, the lower gear is drivingly connected to and positionally fixed relative to a respective rotatable bevel gear, and the rotatable bevel gear is drivingly connected to the stationary bevel gear. The respective lower gear and rotatable bevel gear are positionally fixed relative to one another and preferably axially aligned. The reversible motors are fixedly mounted to the head portion. The lower gears, and thus also the rotatable bevel gears, are rotatably mounted relative to the head portion. The stationary bevel gear is located in the hollow interior of the post portion and positionally fixed relative to the base portion. The rotatable bevel gears engage the stationary bevel gear via the transverse conduit of the post portion. For pan motion, the rotatable bevel gears are driven in the same rotational direction around the stationary bevel gear, such that the post portion and head portion rotate relative to the base portion. For tilt motion, the rotatable bevel gears are held motionless on the stationary bevel gear due to counteracting torques applied to the rotatable bevel gears, such that the head portion pivots relative to the post portion and the base portion. According to some embodiments, the pan/tilt mechanism further comprises two intermediary gears, and in each drivetrain of the two symmetrical drivetrains, a respective intermediary gear is drivingly engaged between the belt and the lower gear. For example, the intermediary gears may be double gears which intermesh with the lower gears and with the belts provided as toothed belts. In other embodiments without the intermediary gears, the toothed belts intermesh directly with the lower gears. In either case, the toothed belts may intermesh with drive shaft gears of the reversible motors. Preferably, the rotatable bevel gears are axially aligned with an axis of rotation which is perpendicular to the center axis of the stationary bevel gear. In some embodiments, the head portion contains a motor cradle structure, the reversible motors are fixedly mounted to the motor cradle structure, and the lower gears and the rotatable bevel gears are rotatably mounted relative to the motor cradle structure. Preferably, the motor cradle structure is pivotably mounted to the post portion at either end of the transverse conduit, with the motor cradle structure positioned between the lower gears and the rotatable bevel gears. Of course, head portion's optical device may be an LED lamp, halogen lamp, HID lamp, camera, infrared sensor, or heat sensor, or any other suitable device. The base portion may be a support arm for mounting to a vehicle pillar, or the base portion for a different searchlight assembly application using the pan-tilt mechanism.

The foregoing embodiments and aspects thereof may be practiced independently or combined with any other embodiments and aspects thereof according to the present disclosure. In addition to the aspects and embodiments described above, further aspects and embodiments will become apparent by reference to the accompanying drawings forming a part of this specification.

BRIEF DESCRIPTION OF THE DRAWINGS

The following description is provided on the basis of example embodiments with reference to the appended figures, wherein:

FIG. 21 shows the trim cover of FIG. 20A with openings formed therein;

FIG. 22 shows a rear view of the trim cover of FIG. 21;

FIG. 23 shows a detail view of box 23 of FIG. 22;

FIG. 24 shows the trim cover of FIG. 21 with another embodiment of the mounting assembly;

FIG. 25 shows a front perspective view of the mounting assembly of FIG. 24;

FIG. 26 shows a bottom perspective view of the mounting assembly of FIG. 25;

Before explaining the selected embodiments, it is to be understood that the present disclosure is not limited in application to the details of the particular arrangements shown and is capable of other embodiments. While certain embodiments are illustrated in reference to the figures, it is intended that the embodiments and figures disclosed herein are to be considered illustrative rather than limiting. Also, the terminology used herein is for the purpose of description and not of limitation.

DETAILED DESCRIPTION

As used herein, the terms "front", "forward" and the like refer generally to the normal direction of travel of an automobile having a searchlight system according to the present disclosure, while the terms "rear", "back" and the like refer generally to the opposite or reverse direction.

Figure 1A:
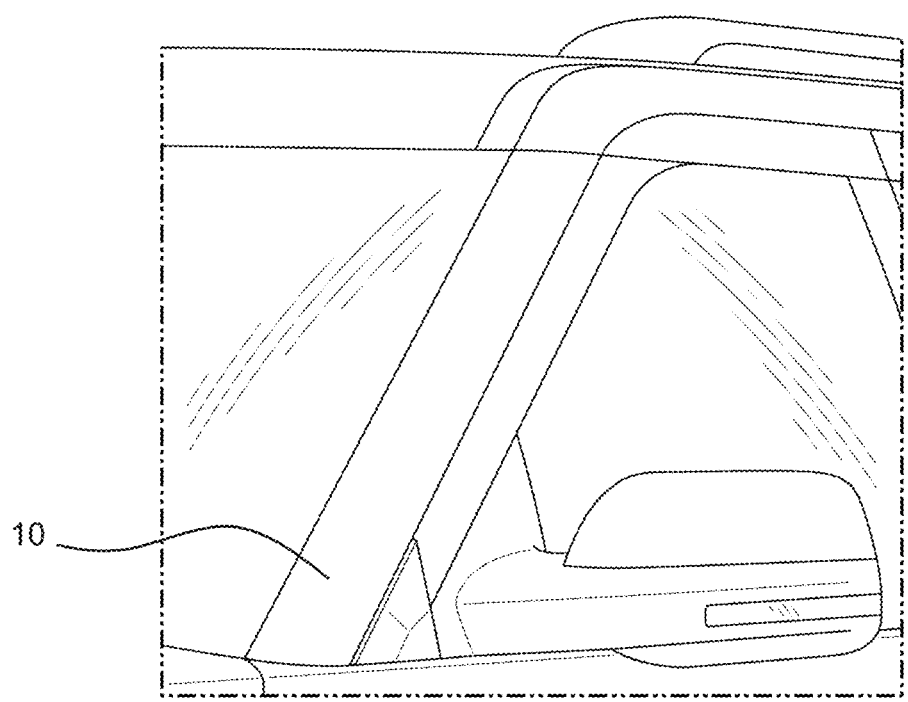
FIG. 1A shows a front perspective view of a vehicle's left A-pillar with trim cover.
Figure 1B:
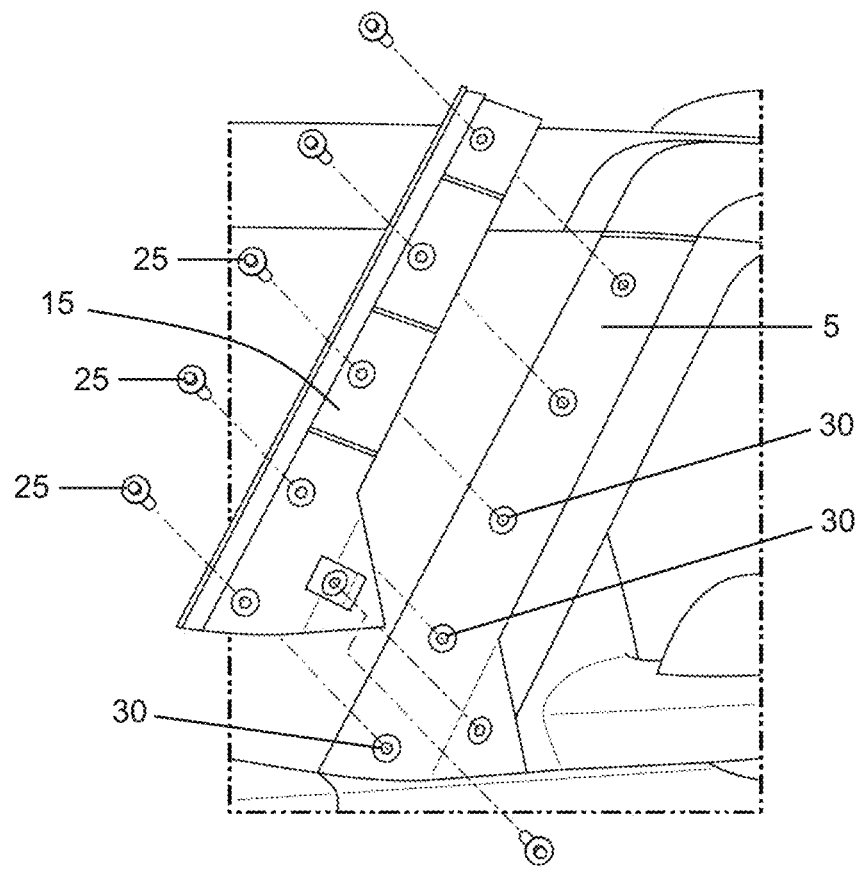
FIG. 1B shows the vehicle A-pillar of FIG. 1A without the trim cover, with underlying components in exploded view.

FIG. 1A shows the left A-pillar of an automobile with a trim cover 10. These types of covers are also generally referred to as windshield, pillar or side trim pieces or moldings. The automobile in the depicted embodiment is a 2012-2019 Ford Explorer. The cover 10 snaps onto and covers a base trim piece 15 which is secured via fasteners 25 (e.g. bolts) to the A-pillar of the automobile frame (see FIG. 1B). The A-pillar 5 in this type of construction includes threaded mating holes 30 for receiving the fasteners 25 which secure the base piece 15 thereto. When these components are assembled, the cover 10 gives a finished aesthetic appearance to the automobile exterior.

Figure 2:
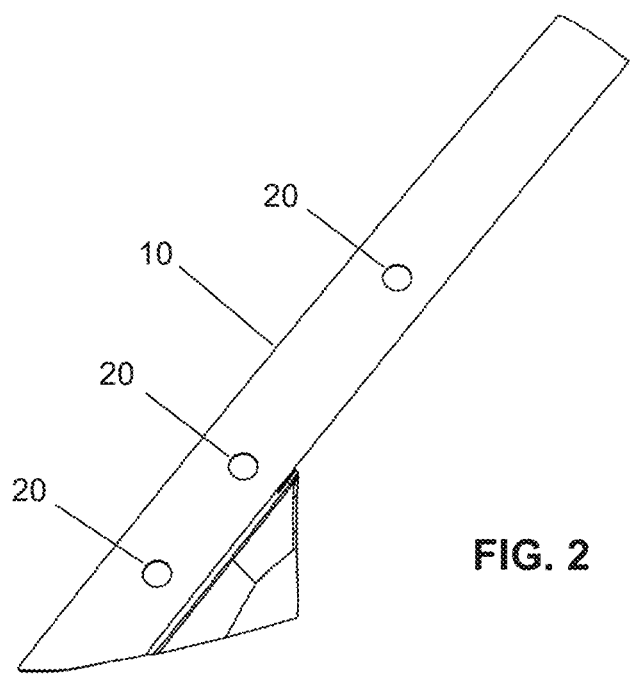
FIG. 2 shows the trim cover of FIG. 1A with openings formed therein.
Figure 3:
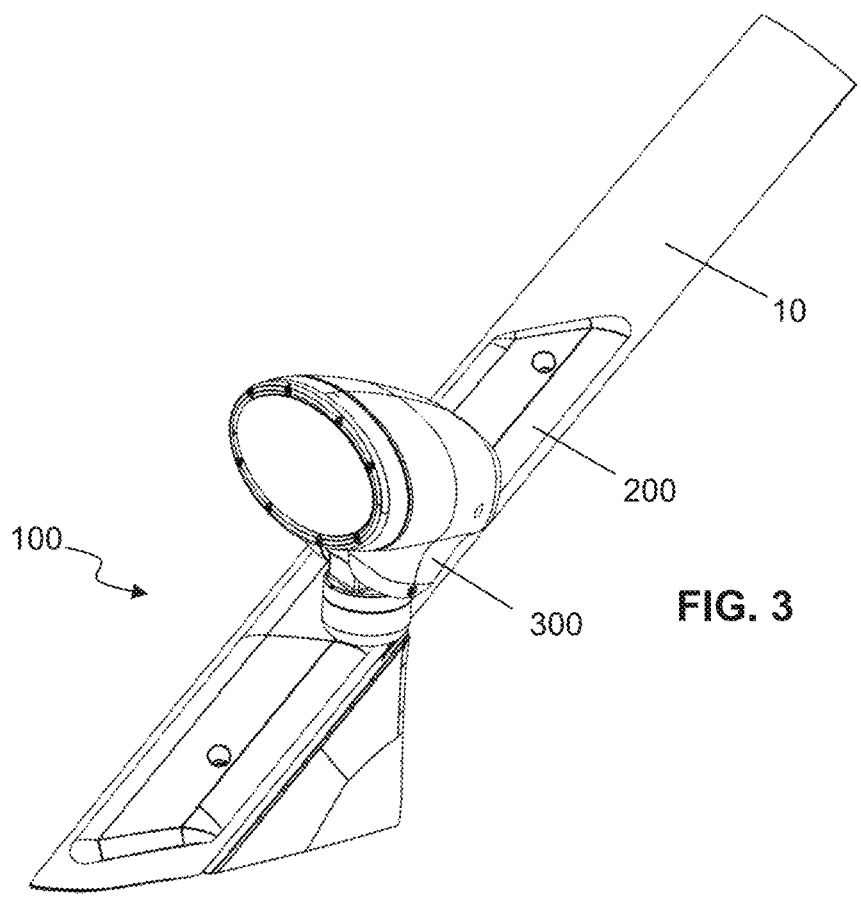
FIG. 3 shows a front perspective view of a searchlight system mounted on the trim cover of FIG. 2.
Figure 4:
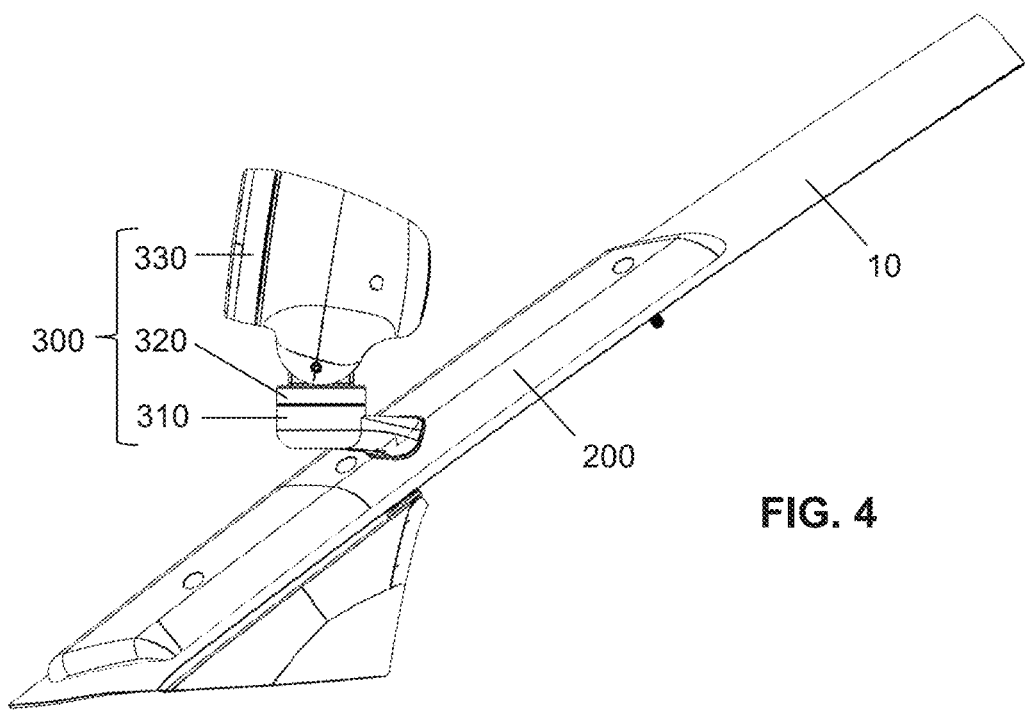
FIG. 4 shows a left side view of the searchlight system and trim cover of FIG. 3.
Figure 5:
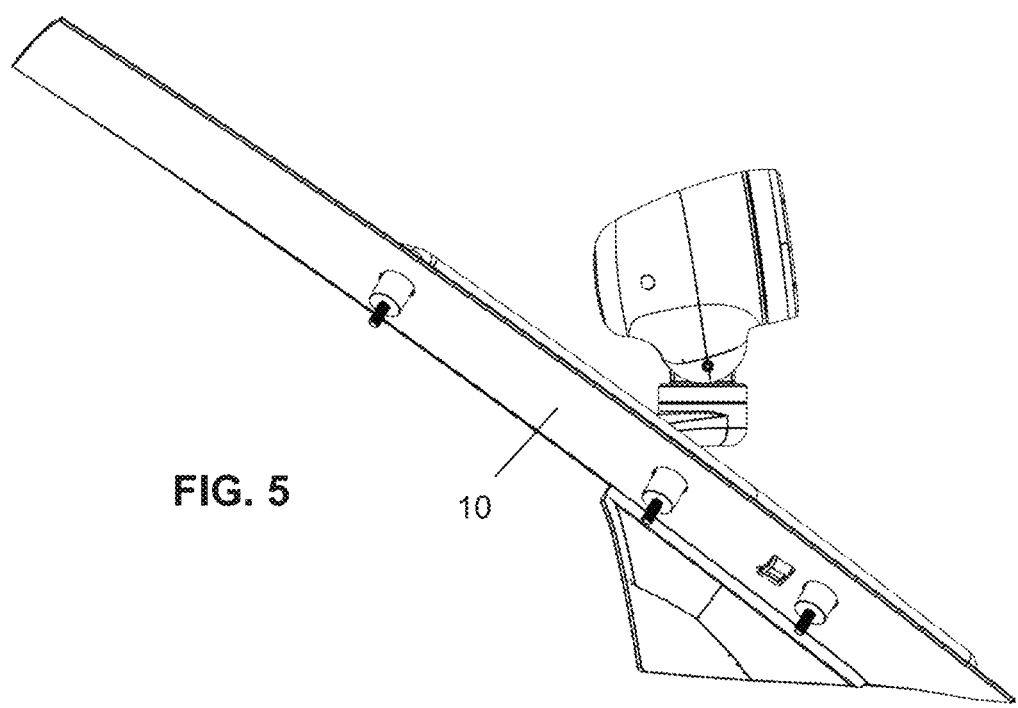
FIG. 5 shows a right side view of the searchlight system and trim cover of FIG. 4.
Figure 6:
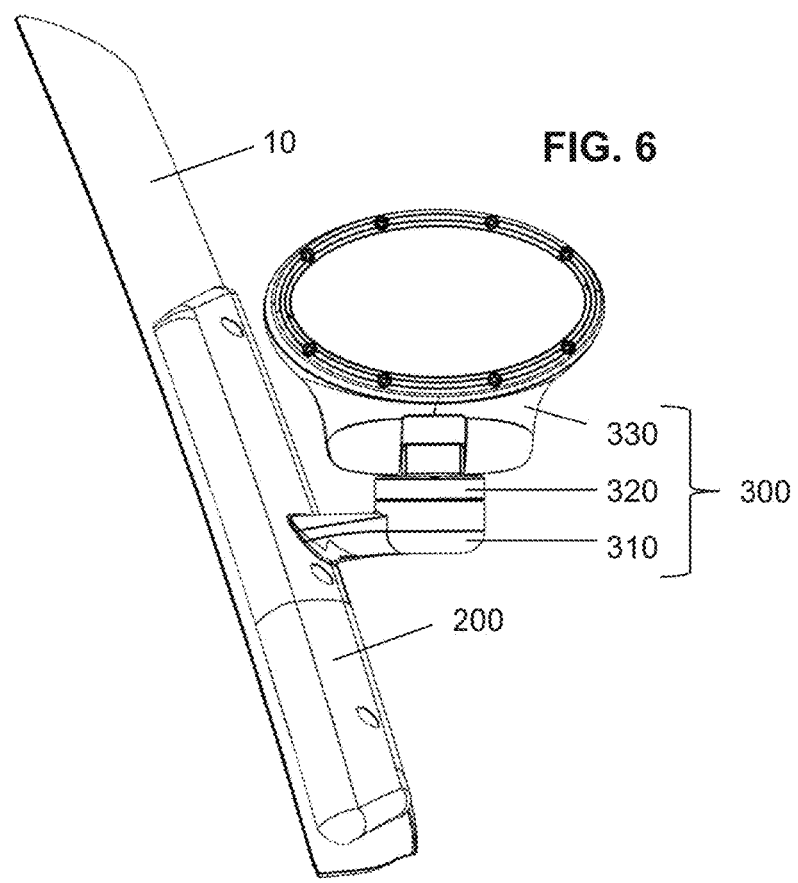
FIG. 6 shows a front side view of the searchlight system and trim cover of FIG. 3.
Figure 7:
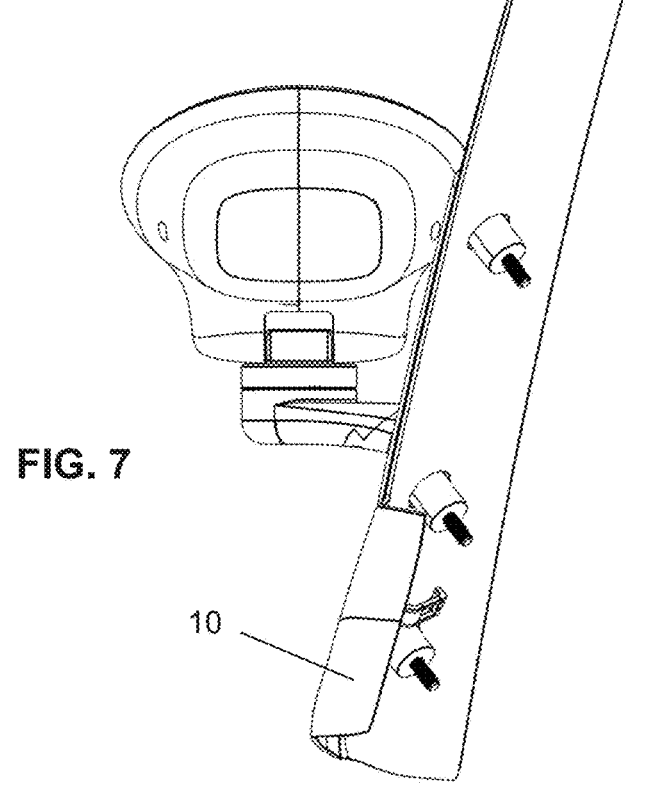
FIG. 7 shows a back side view of the searchlight system and trim cover of FIG. 6.
Figure 8:
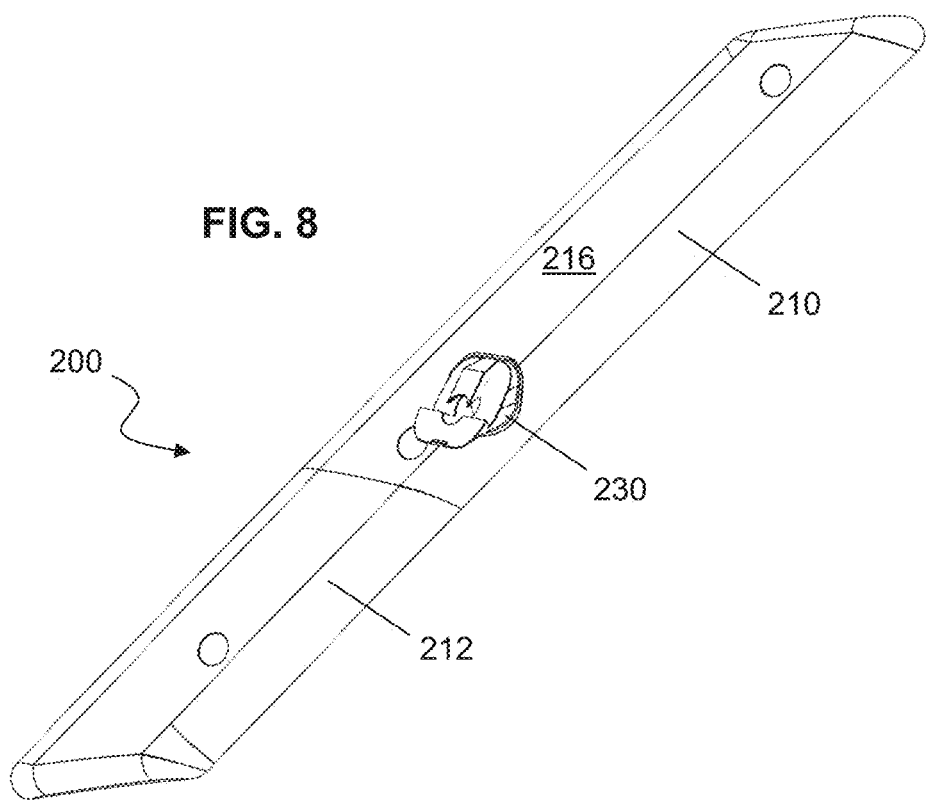
FIG. 8 shows a front perspective view of the mounting assembly of FIG. 3.
Figure 9:
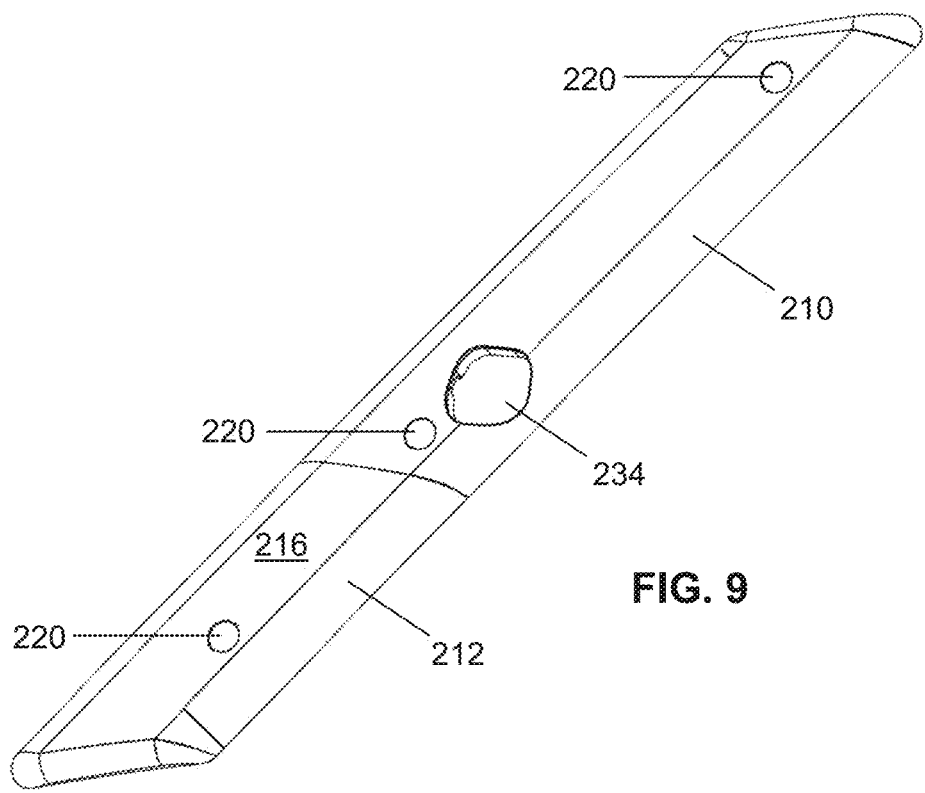
FIG. 9 shows the mounting assembly of FIG. 8 without the adapter.
Figure 10:
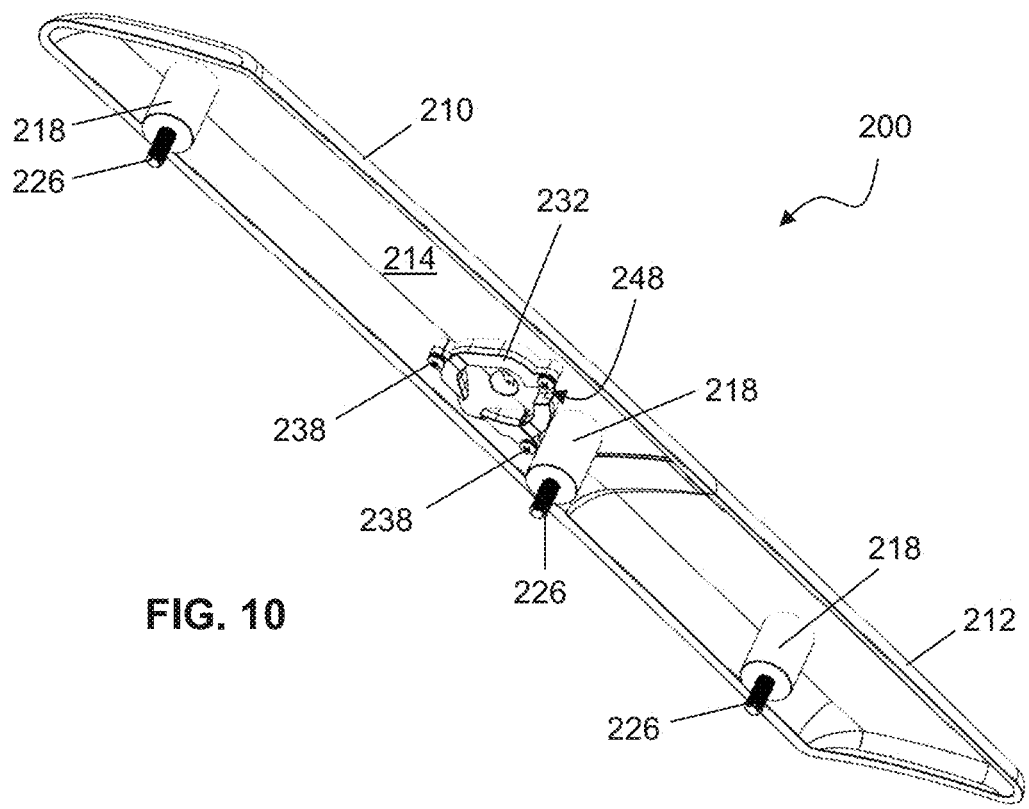
FIG. 10 shows a bottom perspective view of the mounting assembly of FIG. 8.
Figure 11:
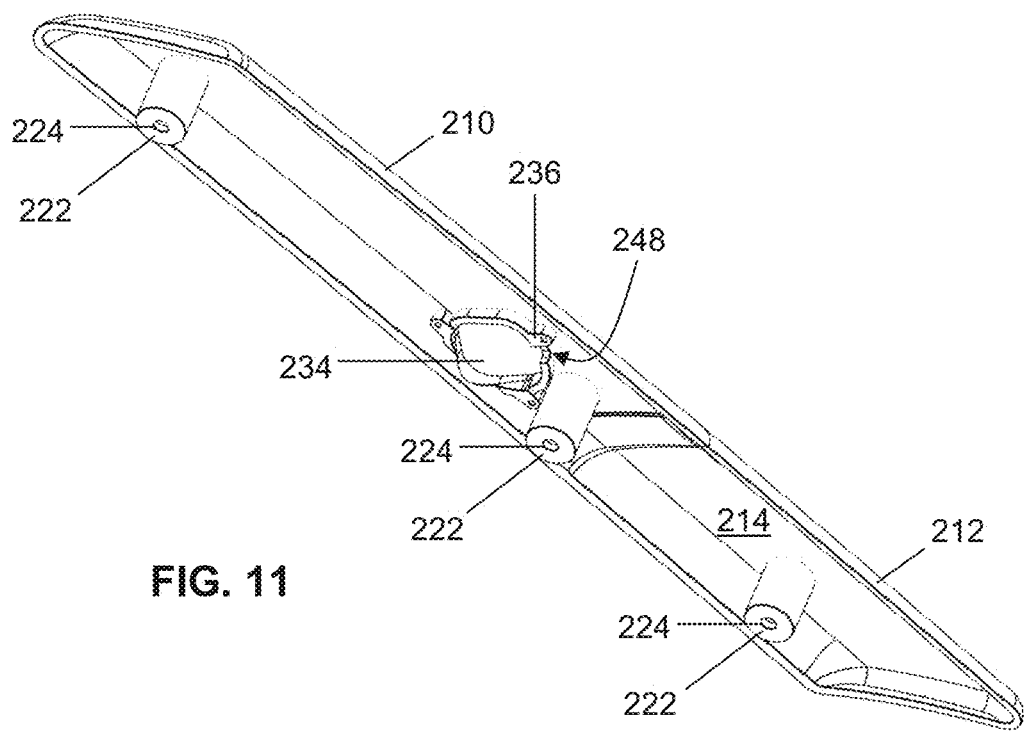
FIG. 11 shows the mounting assembly of FIG. 10 without the adapter and fasteners.
Figure 12:
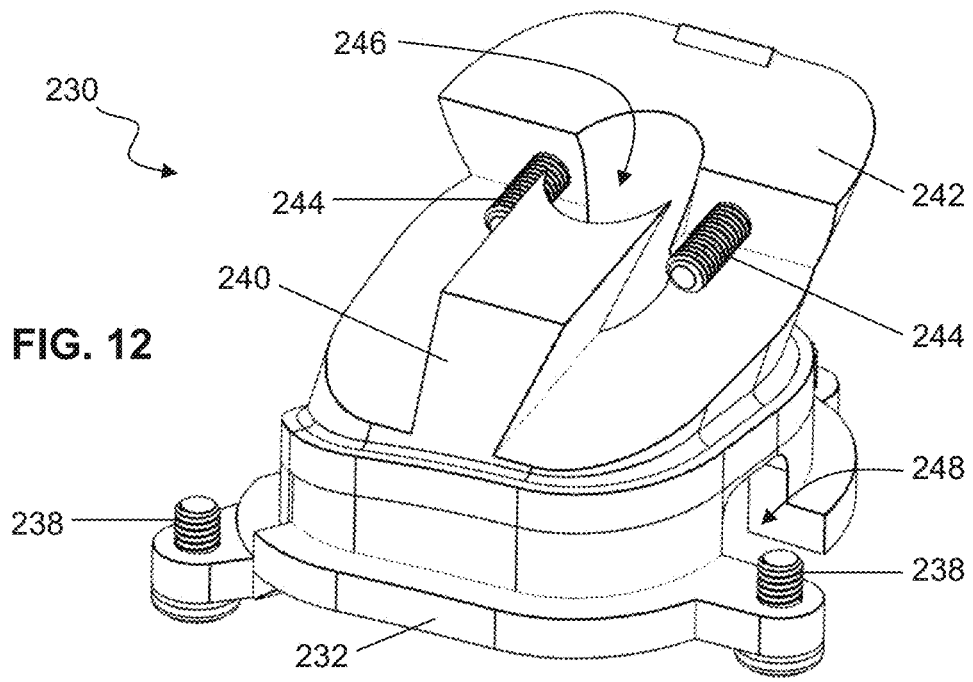
FIG. 12 shows a top rear perspective view of the adapter of FIG. 8 without the brackets.
Figure 13:
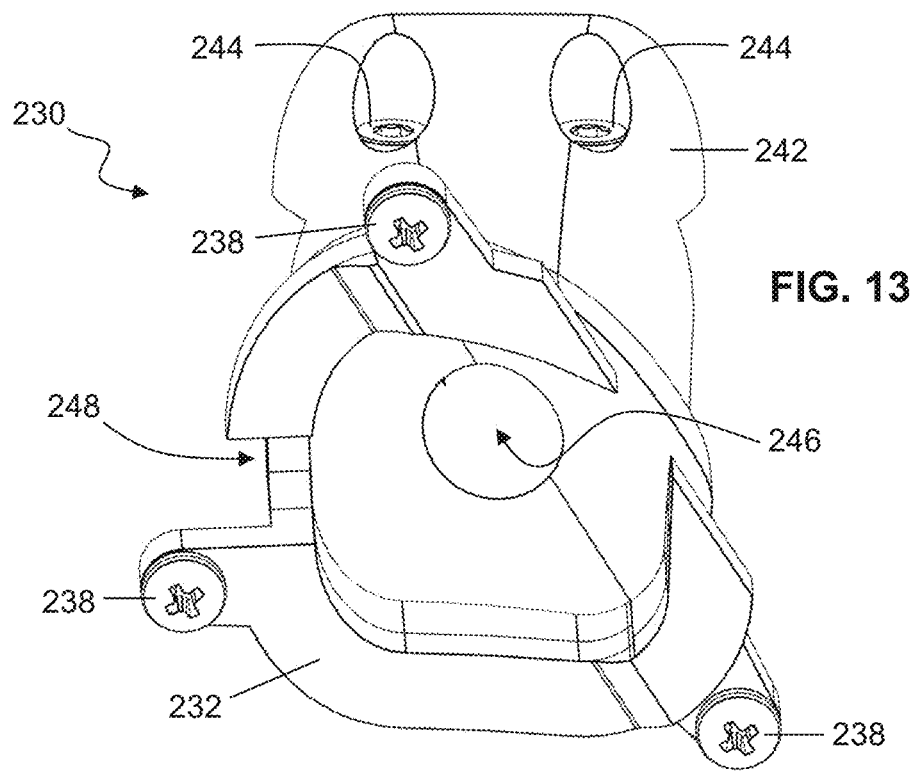
FIG. 13 shows a bottom front perspective view of the adapter of FIG. 12.
Figure 14:
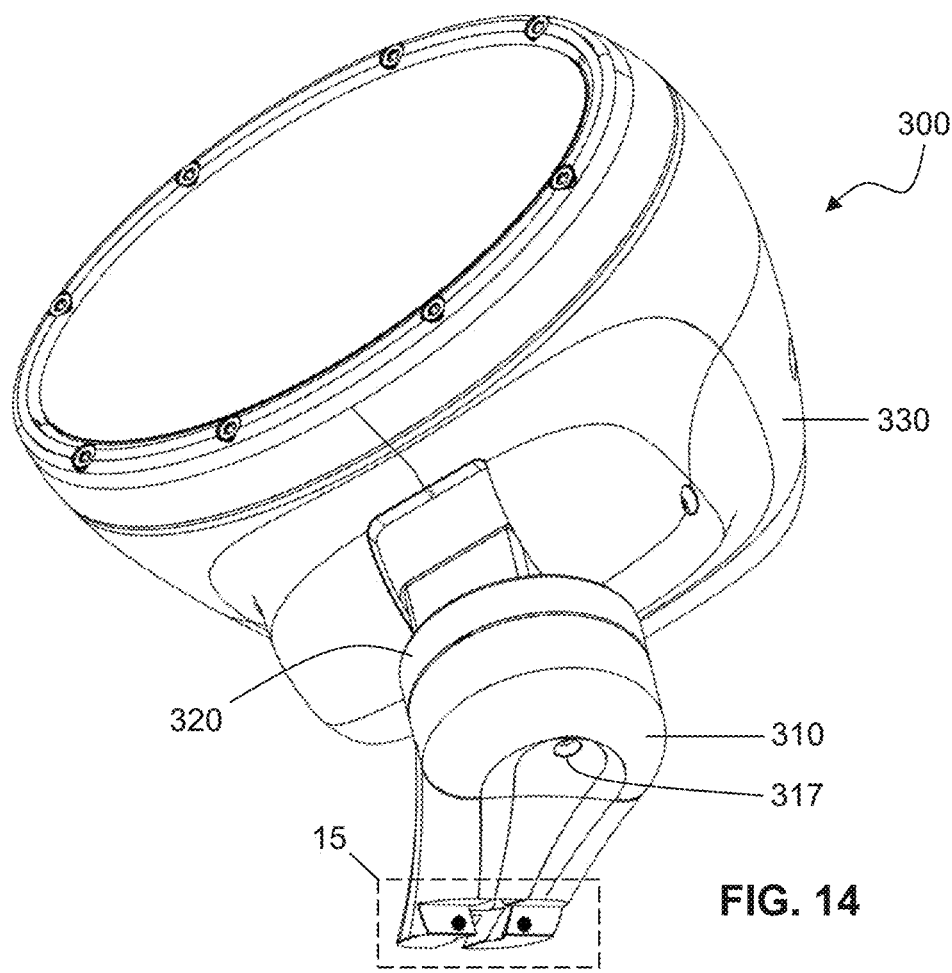
FIG. 14 shows a bottom front perspective view of the searchlight assembly of FIG. 3.
Figure 15:
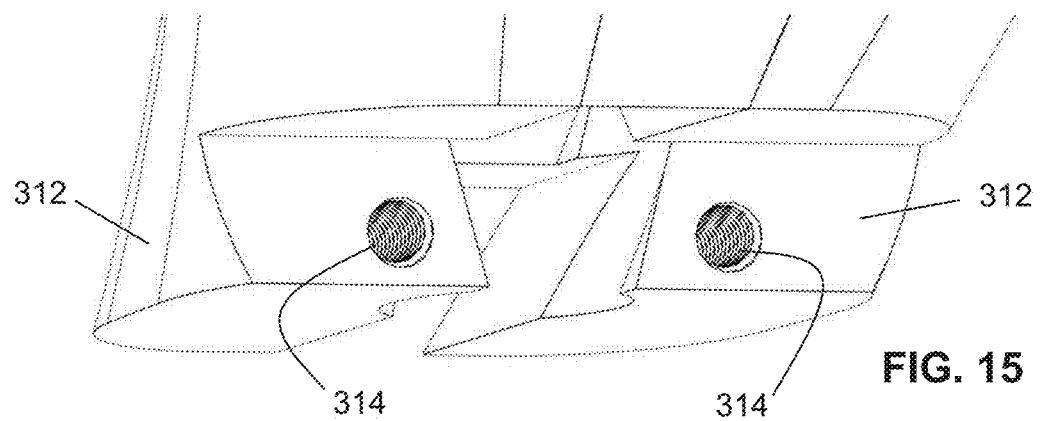
FIG. 15 shows a detail view of box 15 of FIG. 14.
Figure 16:
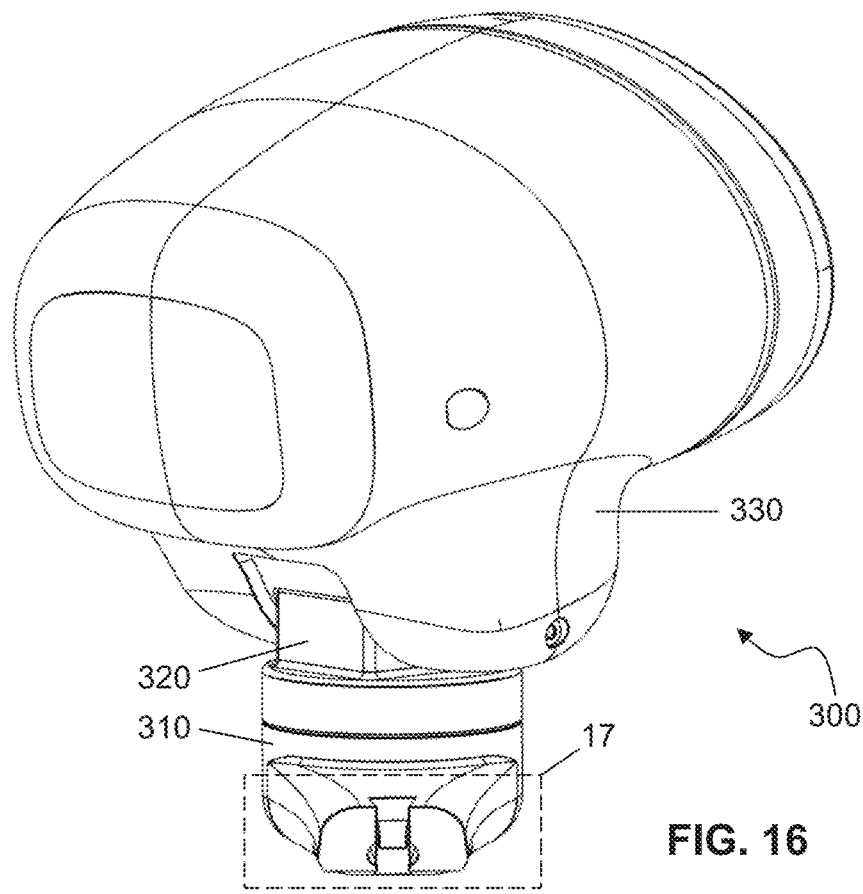
FIG. 16 shows a back side perspective view of the searchlight assembly of FIG. 14.
Figure 17:
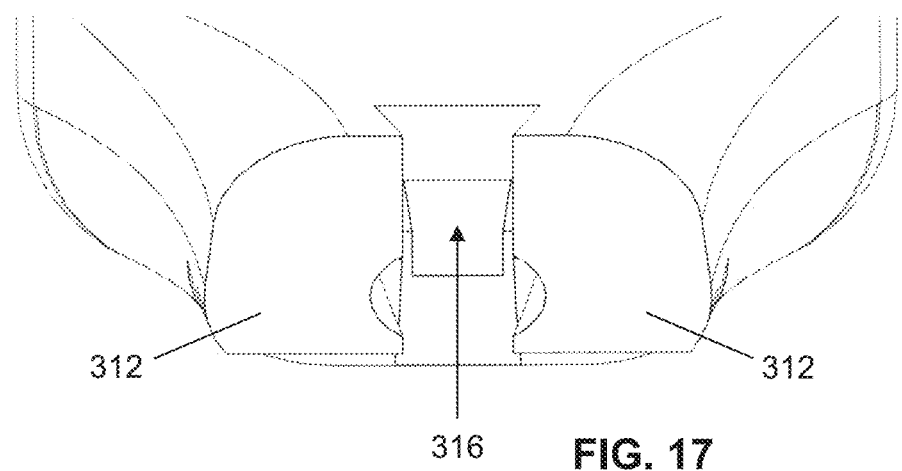
FIG. 17 shows a detail view of box 17 of FIG. 16.
Figure 18:
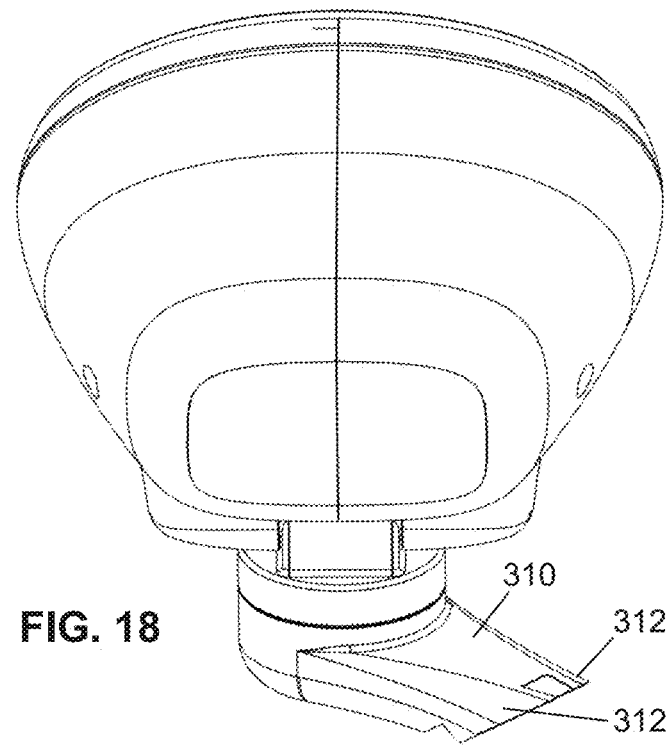
FIG. 18 shows a back perspective view of the searchlight assembly of FIG. 14.
Figure 19:
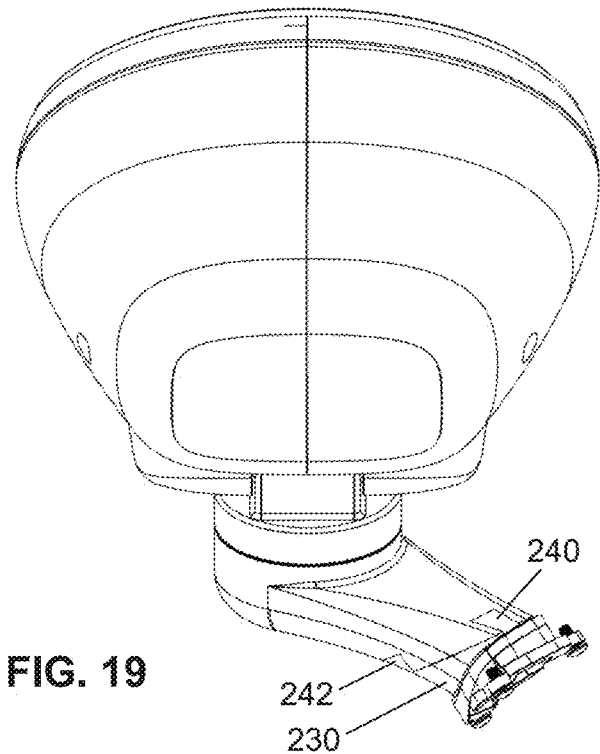
FIG. 19 shows the searchlight assembly of FIG. 18 connected to the adapter of the mounting assembly.

FIG. 2 shows the trim cover 10 of FIG. 1A with openings 20 introduced for installing a searchlight system according to the present disclosure. As discussed in more detail below, the openings 20 in the cover 10 are aligned with the fastener holes 30 in the A-pillar 5. It should be appreciated that the specific location and arrangement of the openings 20 may be different depending on the automobile model.

FIGS. 3-7 show a searchlight system 100 mounted on the trim cover 10. The system 100 comprises a mounting assembly 200 and a searchlight assembly 300. As discussed in more detail below, the searchlight assembly 300 comprises a support arm or base portion 310, a pivot post or yoke portion 320, and a head portion 330.

Referring also now to FIGS. 8-13, the mounting assembly 200 comprises one or more brackets 210, 212 and an adapter 230. Each bracket 210, 212 has an interior surface 214, which faces in the direction of the automobile frame when installed, and an exterior surface 216, which faces away from the automobile when installed. Each bracket 210, 212 has a shell construction which forms a cavity bounded by the interior surface 214. This cavity provides clearance space between the brackets 210, 212 and the cover 10 for running wiring (not shown).

The brackets 210, 212 have projections 218 extending out from the interior surface 214. The projections 218 are inserted into the openings 20 of the cover 10 during installation. A bore 220 is formed into each projection 218 from the exterior surface 216 of the brackets 210, 212. The diameter of the bore 220 is sized to allow passage of the head of the fastener 226. Each projection 218 has an end wall 222 on its side opposite the interior surface 214. The end wall 222 has a bore 224 sized to allow passage of the shank of the fastener 226, but not the head of the faster 226, and therefore provides a contact surface for tightening the fastener 226. Therefore, bore 224 is smaller in diameter than bore 220 and together they form a counterbore (or countersink) within the projection 218. In this way, the fastener 226 may be inserted into the bore 220 at the exterior surface 216, then through the bore 224 of the end wall 222 of each projection 218—which extend through the openings 20 of the trim piece 10—into the fastener receiving hole 30 of the A-pillar 5, and then tightened against the contact surface provided by the end wall 222 to securely couple the brackets 210, 212 to the A-pillar 5 and trim pieces 10, 15.

It should be appreciated that the length of the projection 218 from the interior surface 214 (in conjunction with the depth of the cavity formed by the shell construction of the brackets 210, 212) determines how close the fastener contact surface of the end wall 222 is positioned relative to the fastener receiving hole 30 of the A-pillar 5. In embodiments where the original A-pillar fasteners are to be reused in installing the mounting assembly 200 (i.e. fasteners 25 are fasteners 226), the length of each projection 218 should permit a secure connection whereby the fastener 226 sufficiently extends into the fastener receiving hole of the A-pillar. In other embodiments, for example if longer replacement fasteners are to be used as fasteners 226 in installing the mounting assembly 200, the length of the projections 218 may be reduced or the projections 218 omitted altogether (in which case the exterior surfaces 216 of the brackets may provide the fastener contact surface and the size of the openings 220 reduced to allow passage of the fastener shank, but not the fastener head).

The depicted embodiment includes separate upper and lower brackets 210, 212. With this configuration, the upper bracket 210 may be mounted first, and any wiring of the searchlight assembly 300 may then be run before the lower bracket 212 is installed. The wiring can be run down into the windshield cowling area and through the firewall (which typically has apertures) separating the engine compartment from the passenger compartment. In this way, the searchlight assembly 300 may be controlled by a user within the passenger cabin. The lower bracket 212 largely serves a cosmetic/protective function in covering the wiring, rather than a structural function in supporting the searchlight assembly 300. It should be appreciated that other embodiments may instead include only one bracket or more than two brackets, which additionally may differ in extent along the A-pillar.

In the depicted embodiment, the adapter 230 is provided as a separate component from the brackets 210, 212. The adapter 230 comprises a mounting collar 232 which has a wider geometry than the remainder of the adapter 230. In this way the adapter 230 may be inserted through an opening 234 of the bracket 210, whereby the mounting collar 232 contacts a corresponding interface surface 236 provided on the interior surface 214 of the bracket 210 and is coupled to the bracket 210 via fasteners 238. This approach may be advantageous for fabrication purposes given the relatively complicated structure of the adapter 230 in the depicted embodiment. However, it should be appreciated that the adapter 230 and the bracket 210, or brackets 210, 212, may instead be produced as a single-piece in other embodiments. Further, the specific design of the mounting collar 232 and interface surface 236, including the number and position of fasteners 238, may be modified and therefore different from the depicted configuration in other embodiments.

When coupled to bracket 210, the adapter 230 projects outward from the exterior surface 216 of the bracket 210 and provides a structure for connecting the searchlight assembly 300 to the mounting assembly 200. On its free side opposite the bracket 210, the adapter 230 comprises a first projection 240 and a second projection 242. In the depicted embodiment, the projection 240 has a trapezoidal shaped cross section, wherein the base of the projection 240 becomes wider as the projection 240 extends away from adapter 230, although other geometries may also be used (e.g. a bulb shaped cross section). The second projection 242 includes two bores configured to receive fasteners 244 in the direction of the first projection 240. The fasteners 244 are arranged on each side of an internal conduit 246 of the adapter 230. The internal conduit 246 provides a passage for running wiring from the interior of the searchlight assembly 300 through to the internal-facing side of the mounting assembly 200. The adapter mounting collar 232 and/or interface surface 236 may also include a conduit 248 for this purpose.

As seen in FIGS. 14-19, the side of the support arm 310 of the searchlight assembly 300 which interfaces with the adapter 230 of the mounting assembly 200 comprises projections 312. The projections 312 are spaced apart from one another. The space between the projections 312 is configured to receive the projection 240. Thus, the space between the projections 312 forms a channel having a cross section corresponding to the shape of the adapter projection 240, wherein the width of this channel becomes narrower as the projections 312 extend away from the support arm 310. In the depicted embodiment, the facing walls of the projections 312 are angled inward to match the trapezoidal shape of the first adapter projection 240. Each of the support arm projections 312 may further comprise a threaded fastener mating bore 314. As seen here, the support arm 310 also has an internal conduit 316 which provides a passage for running wiring. When the searchlight assembly 300 is installed on the mounting assembly 200 (described below), the conduits 246, 316 are aligned to form a single passage therebetween enclosed by the adapter/support arm projections 240, 242, 312. In other embodiments, wiring from the searchlight assembly 300 may be run directly outside, such as through aperture 317 formed on the bottom side of the support arm 310 (see FIG. 14), rather than internally through the mounting assembly 200, preferably with a protective covering to prevent damage to such exterior wiring extending between the searchlight assembly 300 and the vehicle ingress point.

In attaching the searchlight assembly 300 to the mounting assembly 200, the searchlight assembly 300 is slid onto to the mounting assembly 200, whereby the first projection 240 of the adapter 230 is moved into the space between the projections 312 of the support arm 310 until the second projection 242 of the adapter 230 abuts the projections 312. In this way, a dovetail joint is formed between the adapter projection 240 and arm projections 312. It is preferable if the first adapter projection 240 is arranged above the second adapter projection 242 when the mounting assembly 200 is installed on an automobile. In this case, the searchlight assembly 300 is slid downward onto the adapter 230 until the arm projections 312 are supported against gravity by the second adapter projection 242, which provides a strong attachment in combination with the dovetail mating between the first adapter projection 240 and arm projections 312. Once the supporting arm 310 is positioned on the adapter 230, the fasteners 244 may be inserted through the second adapter projection 242 into the threaded fastener mating bores 314 of the arm projections 312, and then tightened against the contact surface provided by the second adapter projection 242 to further secure the attachment between the searchlight assembly 300 and the mounting assembly 200. Wiring for the searchlight assembly 300 may be run through the mounting assembly 200 before mounting, and pulled taut as the support arm 310 is slid onto the adapter 230 to avoid wire damage during installation.

With this attachment, the searchlight assembly 300 may be readily exchanged with respect to the mounting assembly 200 in a modular manner. For example, it may be desirable to uninstall a particular searchlight assembly for repair or to replace it with another searchlight assembly fitted with a different type of optical or sensor system (e.g. light emitting diodes (LEDs), halogen lamps, high-intensity discharge (HID) lamps, cameras, infrared devices, heat sensitive devices, etc.). The mounting assembly 200 can remain installed on the automobile, ready for use with any searchlight assembly 300 configured to mate with the adapter 230. Therefore, such a modular system 100 may realize substantial benefits in terms searchlight interchangeability and installation time/effort.

Figure 20A:
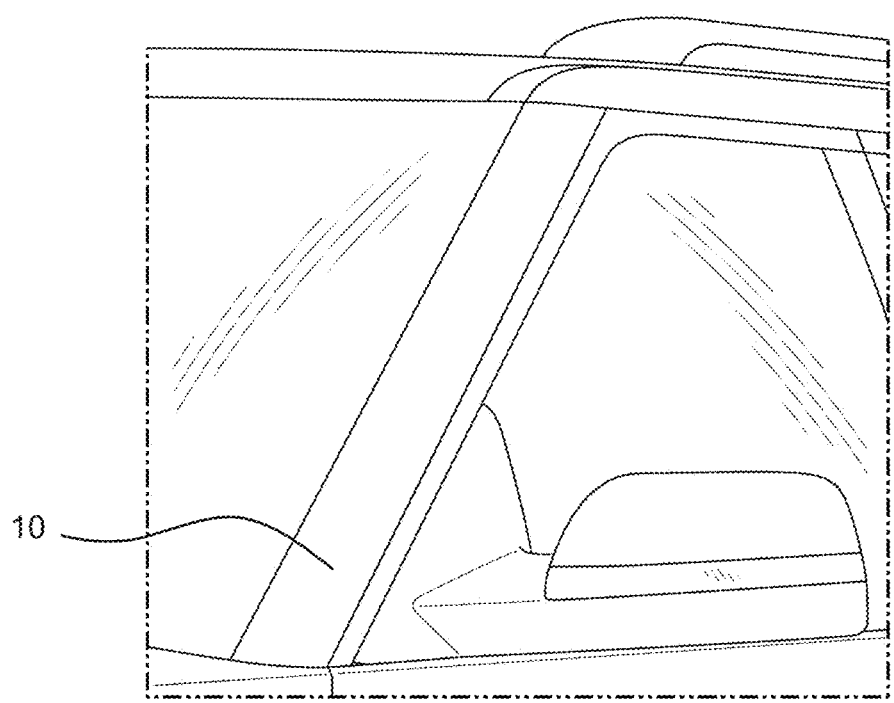
FIG. 20A shows a front perspective view of another vehicle's left A-pillar with trim cover.
Figure 20B:
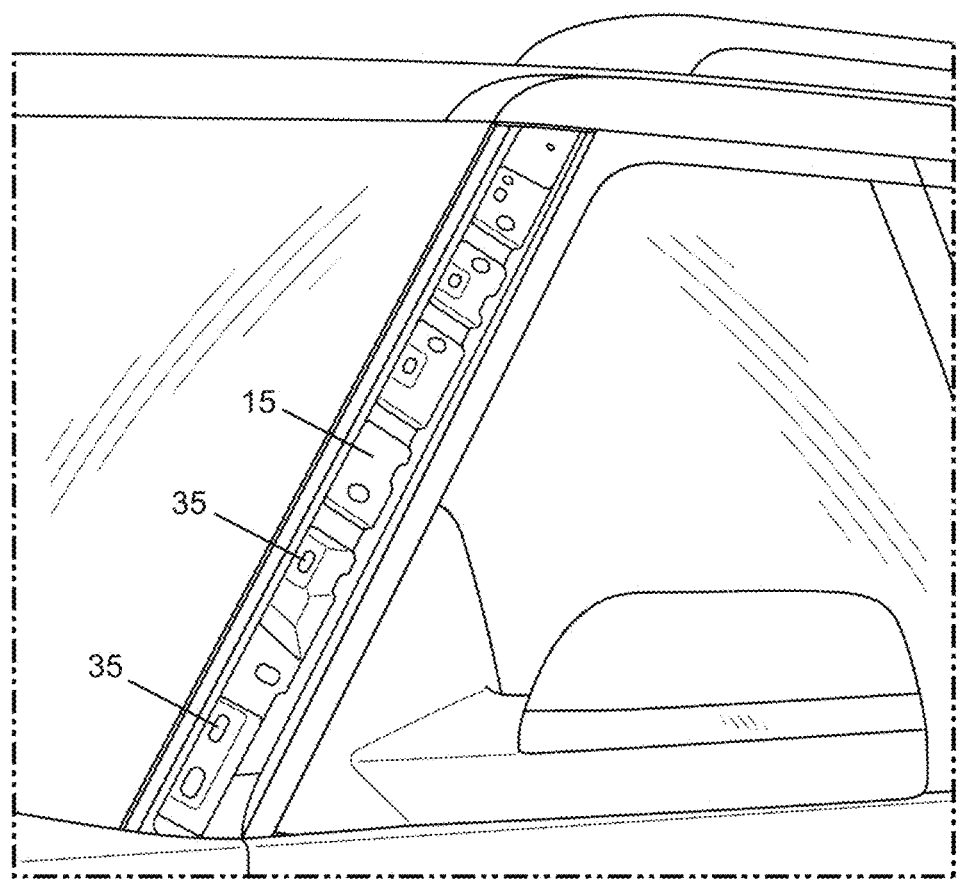
FIG. 20B shows the vehicle A-pillar of FIG. 20A without the trim cover.
Figure 27:
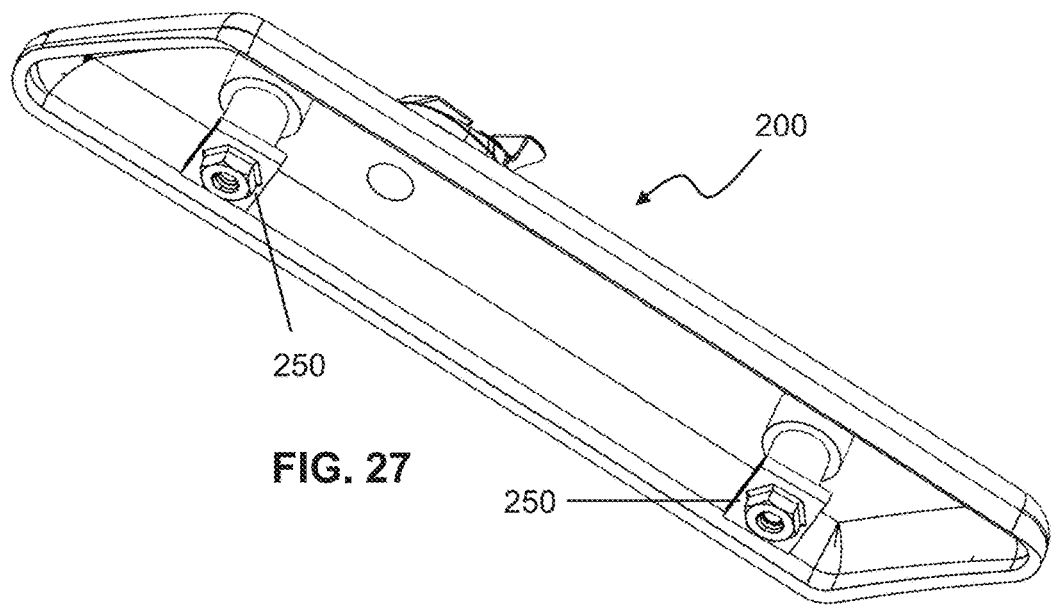
FIG. 27 shows the mounting assembly of FIG. 26 with clip nuts.
Figure 28:
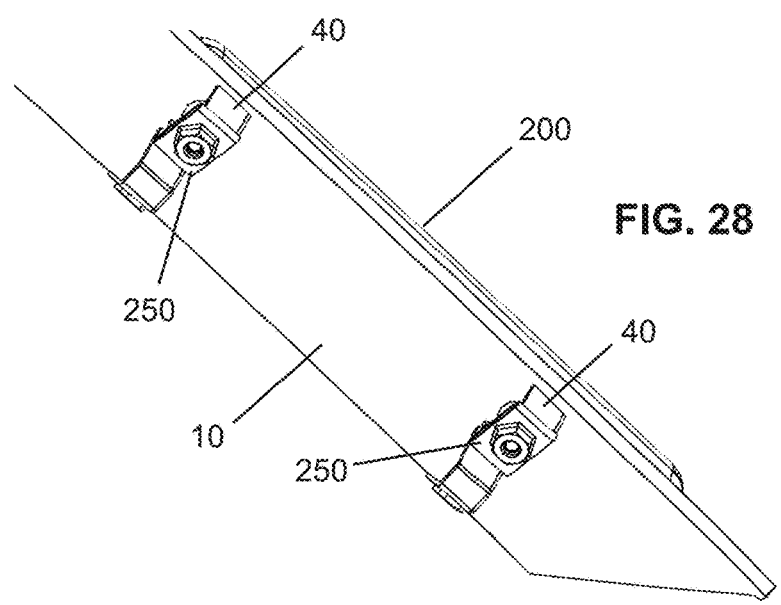
FIG. 28 shows the detail view of FIG. 23 with the mounting assembly and clip nuts installed on the trim cover.
Figure 29:
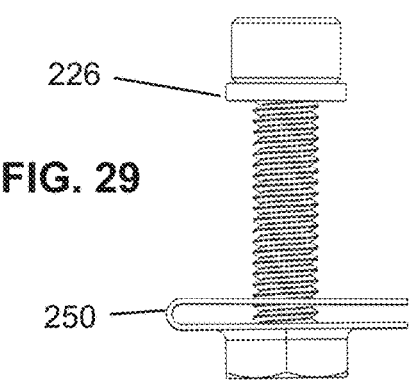
FIG. 29 shows a side view of a fastener and clip nut of the mounting assembly.
Figure 30:
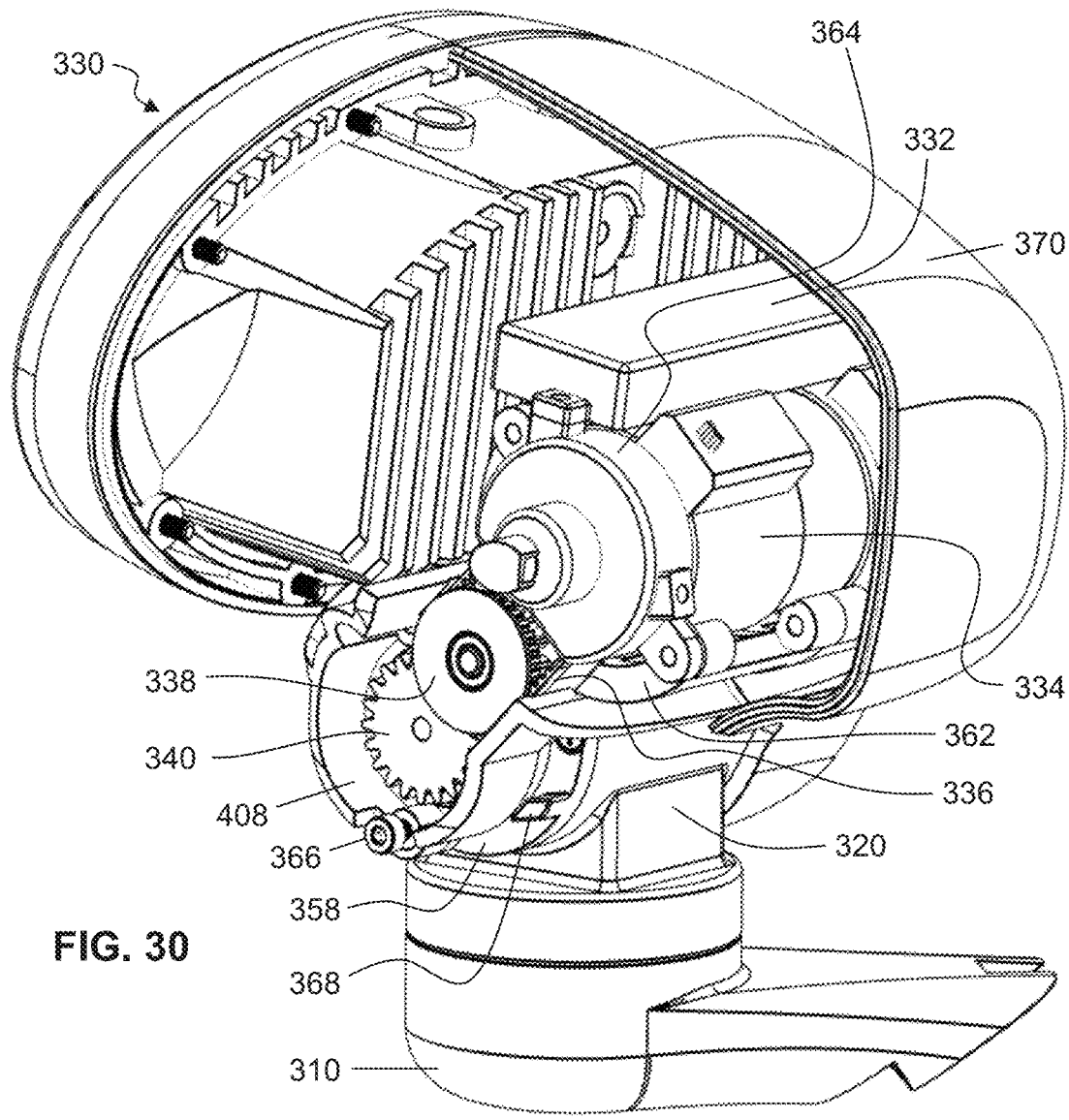
FIG. 30 shows a left side perspective view of the searchlight assembly of FIG. 3 with the left housing shell omitted.
Figure 31:
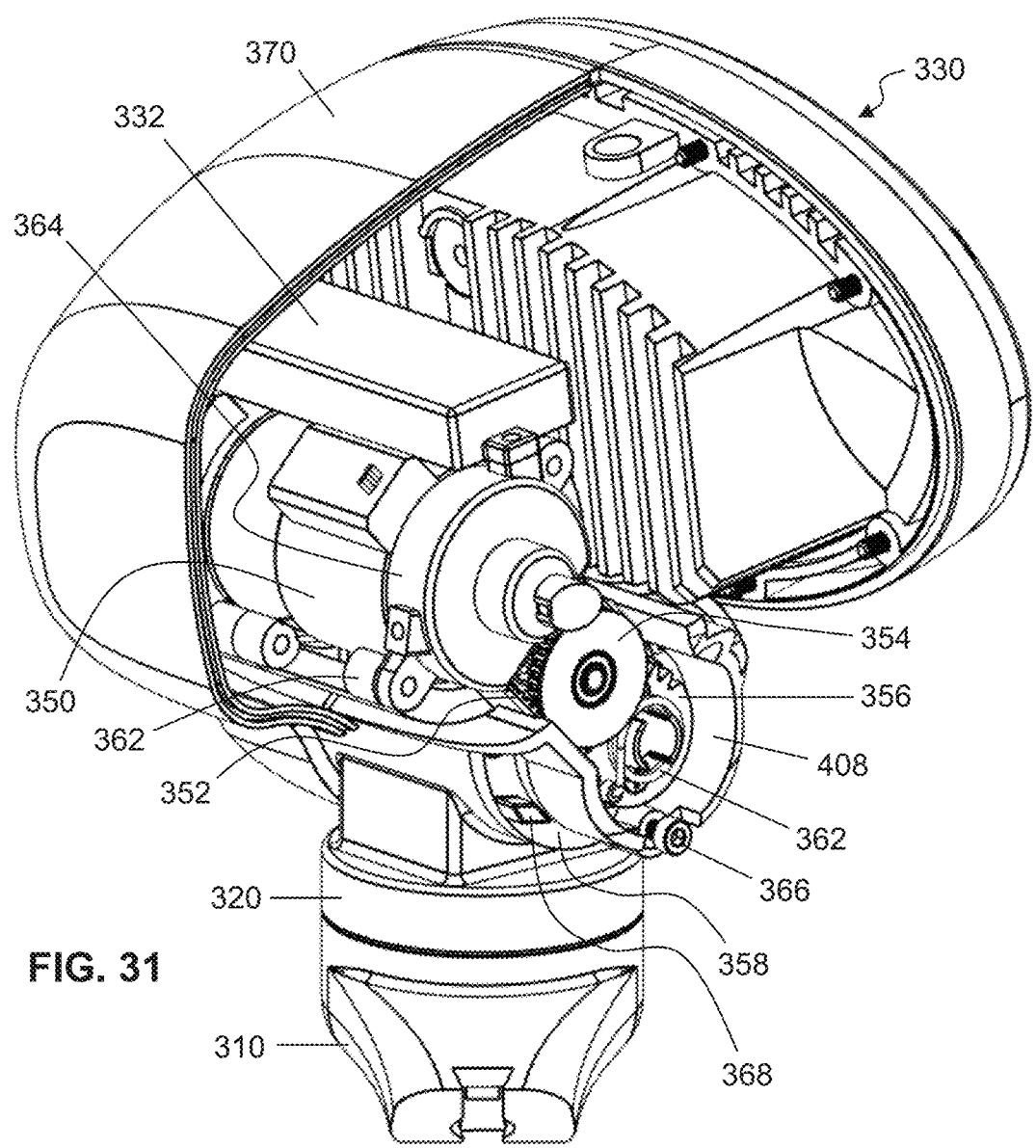
FIG. 31 shows a right side perspective view of the searchlight assembly of FIG. 3 with the right housing shell omitted.
Figure 32:
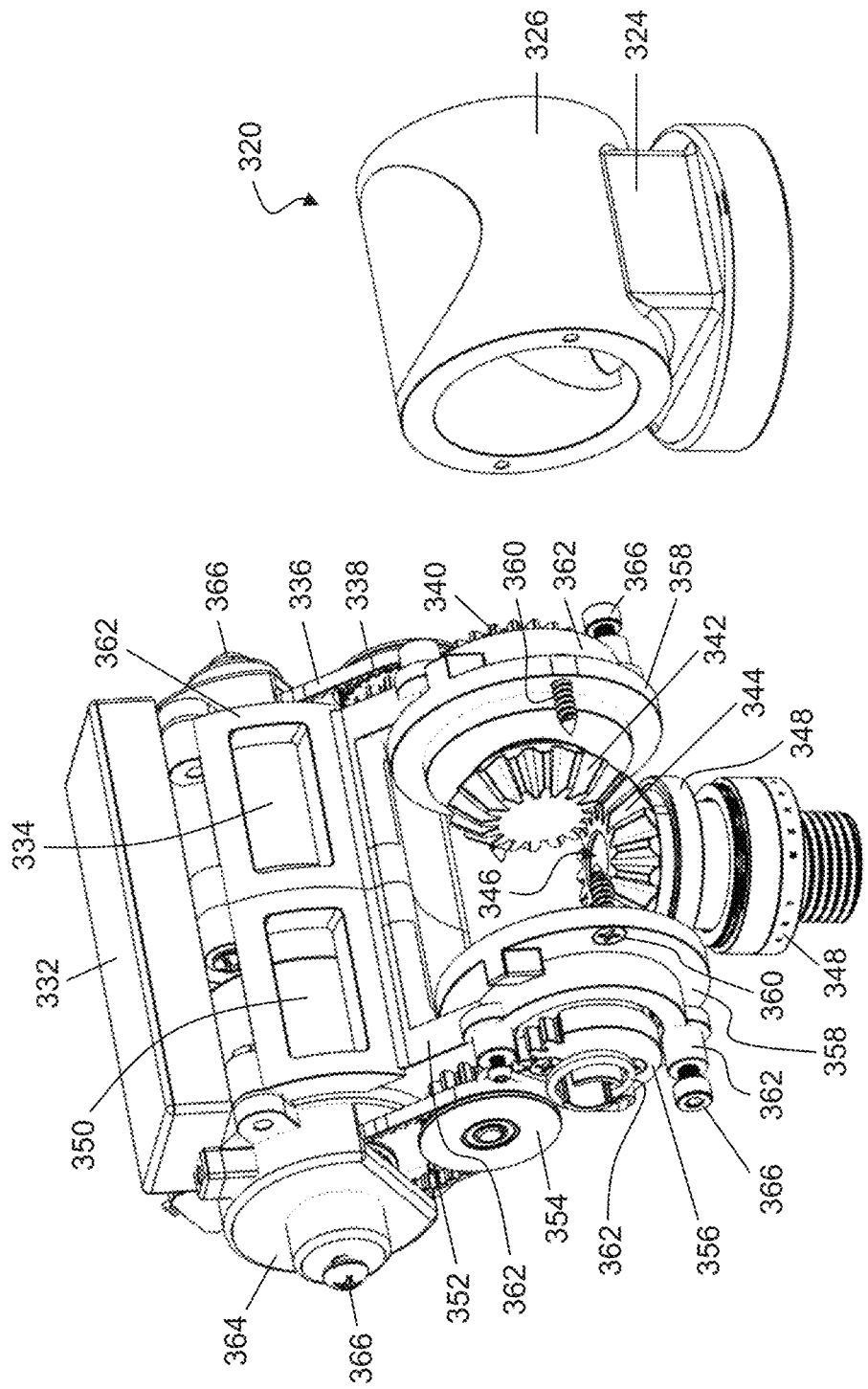
FIG. 32 shows a front perspective view of the pan/tilt drive mechanism components of the searchlight assembly of FIGS. 31-32 with the pivot post component moved to the right.
Figure 33:
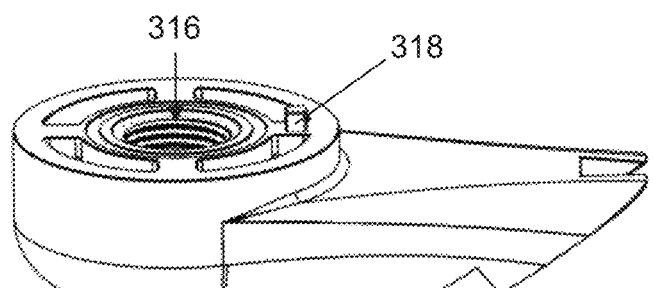
FIG. 33 shows a side perspective view of the support arm of the searchlight assembly of FIGS. 31-32.
Figure 34:
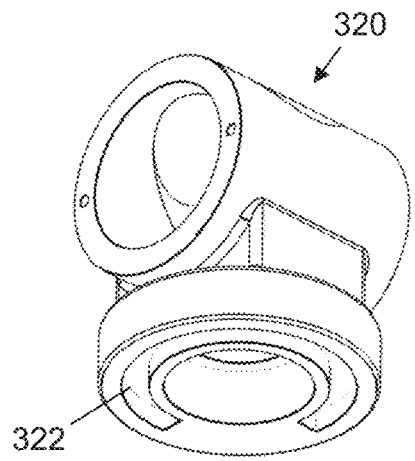
FIG. 34 shows a bottom perspective view of the pivot post component of FIG. 32.

FIGS. 20A-20B show another arrangement of the left A-pillar of a vehicle. The vehicle here is a 2020 Ford Explorer. Here, the A-pillar 5 does not comprise mating holes 30. Rather, the base piece 15 is a metal piece welded onto the A-pillar 5. The base piece 15 has openings 35 for attachment of the trim piece 10. The trim cover 10 with the openings 20 introduced for installing a searchlight system according to the present disclosure is shown in FIG. 21. As seen in FIGS. 22 and 23, the rear side of the trim cover 10 has fittings 40 for snap fasteners (not shown) which couple into the openings 35 of the base piece 15. FIGS. 24-26 show another embodiment of a mounting assembly 200 according to the present disclosure for this A-pillar arrangement. The above descriptions regarding the previous embodiment, including the attachment of the mounting assembly 200 and the searchlight assembly 300, apply here unless otherwise specified and are therefore not repeated. This mounting assembly 200 has a one-piece construction, with the bracket 210 and the adapter 230 produced as a single component. In addition to not having a separate bracket piece 212, this mounting assembly 200 also illustrates another possible arrangement of the bracket 210 with adapter 230 with respect to size, extension and positioning. Referring now to FIGS. 27-29, the mounting assembly 200 further comprises clip nuts 250. The clip nuts 250 couple to the fasteners 226. The clip nuts 250 provide the mating or anchoring structure for the fasteners 226, as the pillar 5 does not have the holes 30 to receive the fasteners 226. The clip nuts 250 are provided adjacent the fittings 40 of the trim cover 10. As best seen in FIG. 29, the clip nuts 250 have a bracket or clip integral with the nut head. The clip nuts 250 are mounted in the openings 35 of the base piece 15, with the bracket of the clip nut 250 holding the metal sheet material of the base piece 15. In this way, the clip nuts 250 can be used to secure the mounting assembly 200 with respect to the vehicle pieces 10, 15 and therefore with respect to the pillar 5. The head and shank of the fastener 226 as well as the inclusion of a washer thereon, which is common with these types of fastener arrangements, are also clearly visible in FIG. 29. Of course, clip nuts 250 may be also used in other embodiments of the mounting assembly 200, for example those with the bracket 210 and adapter 230 provided as separate components and/or including multiple brackets 210, 212, as in the previous example of FIGS. 8-13, depending on the pillar mounting configuration.

Figure 48:
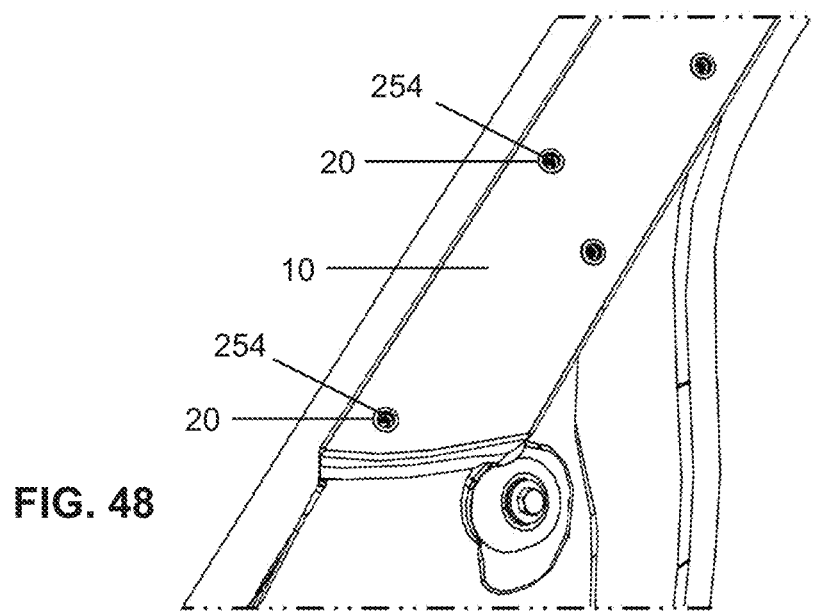
FIG. 48 shows a front perspective view of an area of a vehicle pillar for mounting the searchlight system of FIG. 47.
Figure 49:
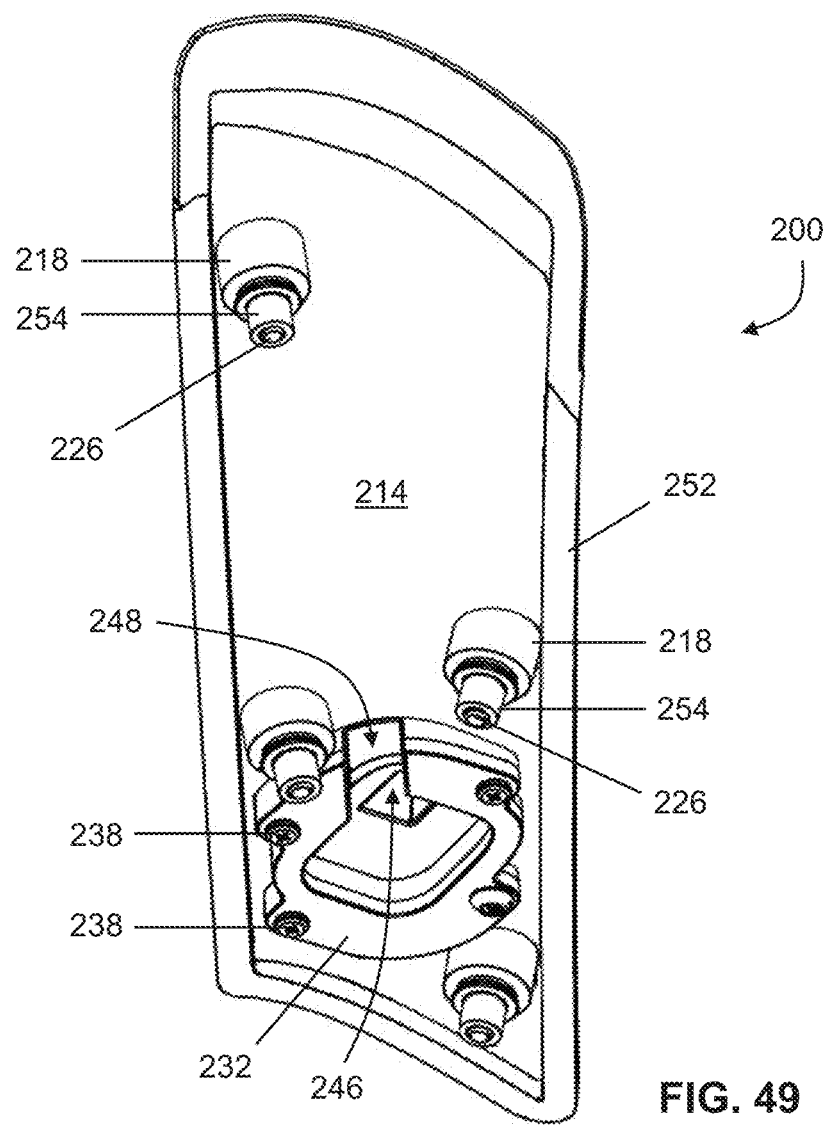
FIG. 49 shows a bottom perspective view of the mounting assembly of the searchlight system of FIG. 47.
Figure 50:
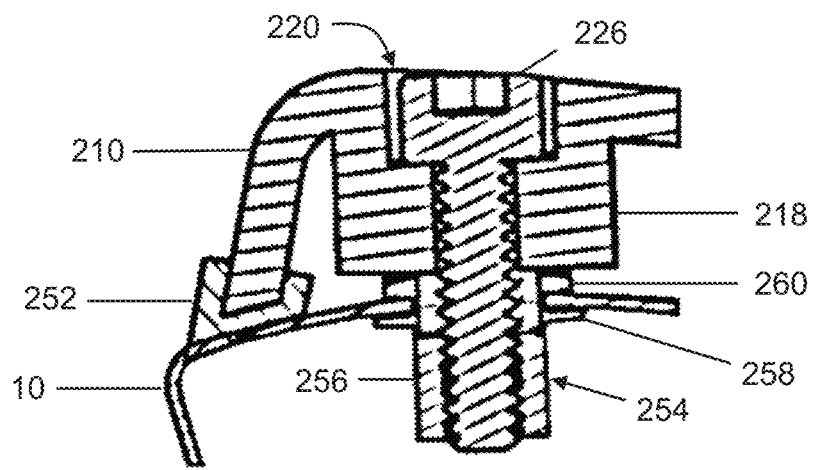
FIG. 50 shows a sectional view through a portion of the mounting assembly with a rivet nut fastened to the vehicle surface.

FIGS. 47-50 show another example searchlight system 100. In this embodiment, the mounting assembly 200 has a single bracket 210 like in the embodiment of FIGS. 24-26, and the adapter 230 is provided as a separate piece connected to the bracket 210 like in the embodiment of FIGS. 8-13. The above descriptions regarding the previous embodiments apply equally here unless otherwise indicated. The bottom edges or sides of the shell-shaped bracket 210 are provided with a gasket 252 for mounting to the vehicle surface 10 under tension. The gasket 252 may form a waterproof seal between the vehicle surface 10 and the bracket 210. The gasket 252 may also prevent the mating surfaces from damaging one another under tension. As seen in FIG. 48, openings 20 are formed in the vehicle surface 10 of the outermost component of the A-pillar structure. In this embodiment, rivet nuts 254 are installed into the openings 20. The rivet nuts 254 provide the threaded anchors for the fasteners 226 to secure the mounting assembly 200 to the vehicle surface 10. The view of FIG. 49 is provided for illustrative purposes, since in practice, the rivet nuts 254 would be installed in the openings 20 formed in the vehicle surface 10 and therefore the bottom of the mounting assembly 200 would be blocked by the vehicle surface in the view of FIG. 49. FIG. 50 shows an installed rivet nut 254 fixed on the vehicle surface 10, with the mounting assembly 200 mounted to the vehicle surface 10. The body 256 of the rivet nut 254 has been collapsed to form a material bulge 258 on the blind side of the vehicle surface 10 using an installation tool. The rivet nut 254 is therefore securely clamped on either side of the vehicle surface 10 with its material bulge 258 and the top flange 260 of the rivet nut 256. The non-collapsed portion of the tubular body 256 has threading for mating with the fastener 226. In this embodiment, the projection 218 does not extend through the opening 20 formed in the vehicle surface 10. This mounting method is highly adaptable across different vehicle designs. According to this method, the rivet nuts 256 are installed in the vehicle surface openings 20 after the step of forming the openings 20 and before the step of mounting the bracket 210 with the fasteners 226.

FIGS. 30-34, show an example pan/tilt mechanism of the searchlight assembly 300. A controller 332 is provided within the searchlight head 330 which controls operation of the electronic components, such as the light source and motors, based on user input (e.g. wired or wireless). The internal components are covered, in part, by at least one housing shell 370. The embodiment of FIGS. 30-34 comprises left and right housing shells 370. Of course, other embodiments may have different configurations. For example, the searchlight head 330 shown in FIG. 47 has three housing shells: a bottom right, a bottom left, and a top half shell.

During horizontal pan movement, the pivot post 320 and the head 330 are both rotated relative to the support arm 310. For the pan mechanism, a first reversible motor 334 drives belt 336, which drives timing pulley or sprocket gear 338. Therefore, in the depicted embodiment, the belt 336 is a toothed, timing, cogged or synchronous belt. Sprocket 338 is a double gear having another gear face which drives vertical gear 340. Pan gear 340 is in a locked connection with the shaft of bevel or miter gear 342, such that rotation of vertical gear 340 causes rotation of miter gear 342. Rotating miter gear 342 acts against fixed bevel or miter gear 344. Miter gear 344 is positionally fixed on the support arm 310, thereby causing rotation of the pivot post 320 and head 330 relative to the support arm 310.

In the depicted embodiment, the bottom end of miter gear 344 comprises threading which mates with the opposite end of the internal conduit 316 of the support arm 310 when the miter gear 344 is installed on the support arm 310, although other configurations may also be used. The miter gear 344 has an internal conduit 346 for running wiring through the internal conduit 316 of the support arm 310 up into the pivot post 320. Bearings 348 are provided between the miter gear 344 and the pivot post 320 for rotating the pivot post 320, and therefore also the head 330, relative to the support arm 310. The support arm 310 may further comprise a stop 318, which sits within a stop channel 322 formed on the bottom of the pivot post 320, to limit the degree of horizontal rotation. In the depicted embodiment, the available pan rotation arc is approximately 270°. The available pan rotation arc is preferably configured to prevent the optical device of the searchlight head 330 from being accidentally pointed into the passenger cabin of the automobile, whereby the approximately 90° arc through which the head 330 is unable to rotate corresponds to the facing direction of the optical device with respect to the passenger cabin area. The length and positional arrangement of the stop channel 322 on the pivot post 320 may be selected for a given application, for example, where the searchlight system 100 is to be mounted to the right A-pillar rather than the left A-pillar of the automobile.

During vertical tilt movement, the head 330 is rotated relative to both the pivot post 320 and the support arm 310. For the tilt mechanism, a second reversible motor 350 drives belt 352, which drives timing pulley or sprocket gear 354. Therefore, in the depicted embodiment, the belt 336 is a toothed, timing, cogged or synchronous belt. Sprocket 354 is a double gear having another gear face which acts against fixed gear 356. Gear 356 is fixed with respect to one of the support plates 358. The support plates 358 are fixed with respect to the pivot post 320 via fasteners 360 in the depicted embodiment. The tilt mechanism may also include a torsion spring 362, which is biased to assist in tilting the head 330 upwards against gravity. A tilt stop 368 is built into one or both support plates 358. The stops 368 limit travel of the cradle 362 during tilt movement, which can be used to prevent over-rotation. The fixed gear 356 and its respective support plate 358 have an internal conduit for running wiring from the pivot post 320 into the interior of the head 330 (e.g. to the controller 332 and/or other electronic components). In other embodiments, the wiring exits through the top of the pivot post 210 and extends upward to enter a cable conduit of a motor cradle structure 362.

The cradle 362 provides a mounting structure for the controller 332, motors 334, 350, and sprockets 338, 354. The cradle 362 is fixed with respect to the housing shell 370, both directly and indirectly through the motor caps 364 via fasteners 366 in the depicted embodiment. Sealed bearings (not shown) are provided between each of the support plates 358 and the cradle 362 for rotating the cradle 362, and therefore the rest of the head 330, relative to the support plates 358, and therefore also the pivot post 320 and support arm 310. On the pan mechanism side, bearings (not shown) are also provided between the respective support plate 358 and both the vertical gear 340 and miter gear 342—which gears 340, 342 rotate together relative to the support plate 358 in acting on the fixed miter gear 344 inside the pivot post 320.

Figure 51:
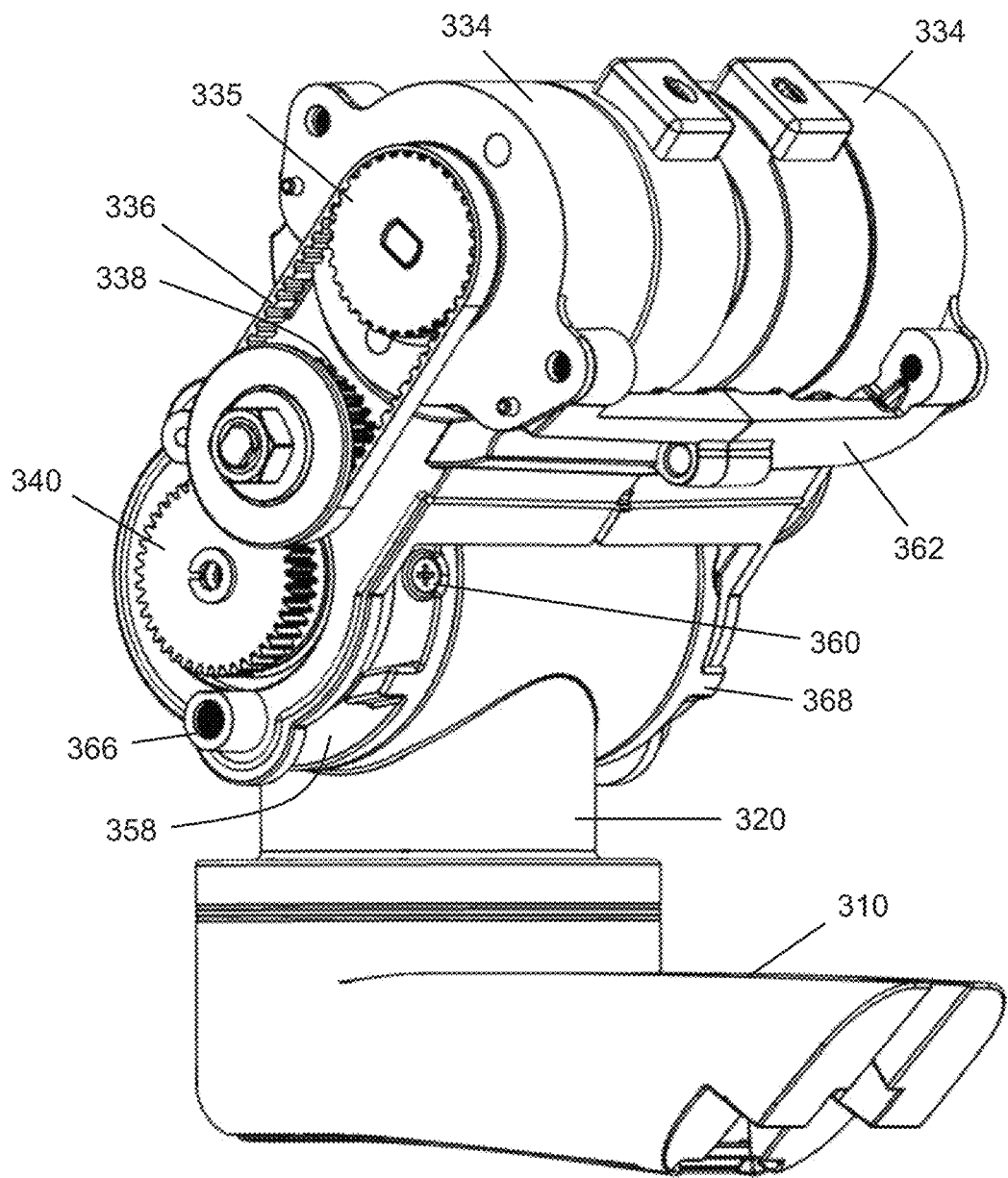
FIG. 51 shows a side rear view of another pan/tilt drive mechanism for the searchlight assembly.
Figure 52A:
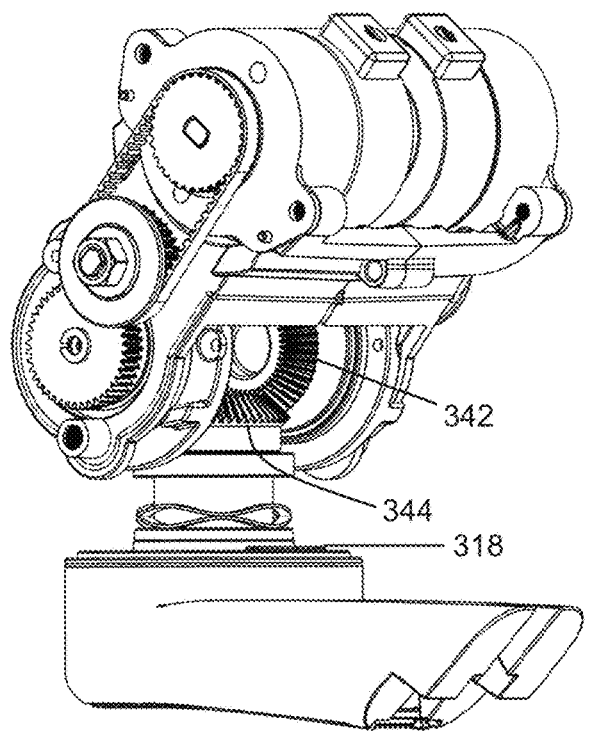
FIG. 52A shows the searchlight assembly of FIG. 51 with the pivot post omitted.
Figure 52B:
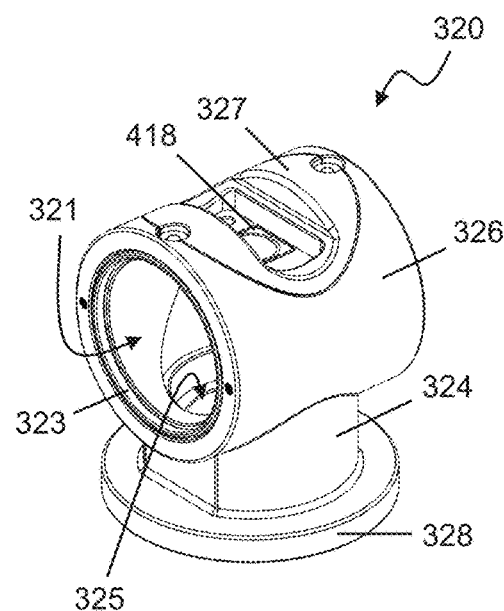
FIG. 52B shows a top perspective view of the pivot post of FIG. 51.
Figure 53:
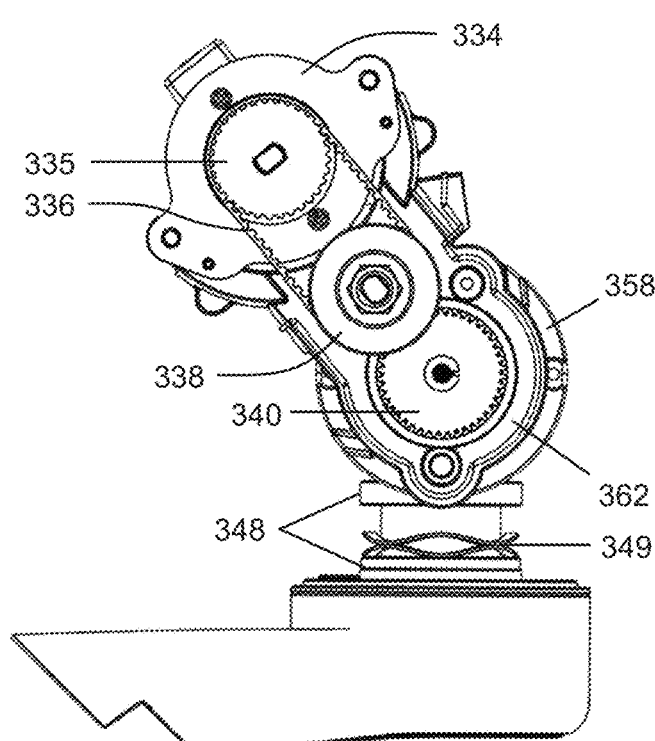
FIG. 53 shows a side view of the searchlight assembly of FIG. 52A.
Figure 52C:
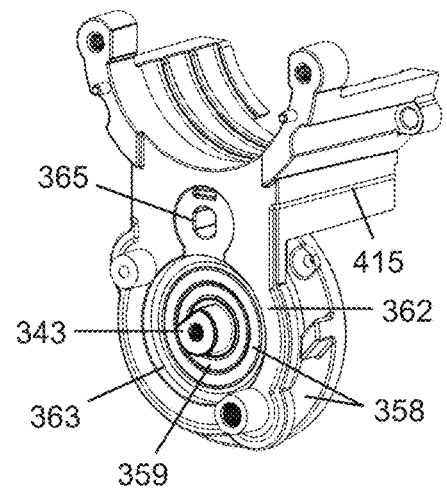
FIG. 52C shows a top perspective view of one side of a motor cradle structure rotatably mounted on a support plate structure with interposed bearings.

FIGS. 51-53 show another preferred design for the pan/tilt mechanism of the searchlight assembly 300. As before, the post portion 320 is rotatably mounted to the base portion 310, and the head portion 330 is pivotably mounted to the post portion 320 opposite the base portion 310. However, in addition to vehicle pillar mounted searchlight assembly applications, it should be appreciated that the pan/tilt mechanism and various aspects disclosed herein may also be used in other applications. The above descriptions made in reference to FIGS. 30-34 apply equally here unless otherwise indicated. Although omitted in the depiction of this embodiment, the searchlight assembly 300 may also have the electronics controller 332, motor caps 364, and fasteners 366 seen in FIG. 32. The post portion 320 has been removed in FIGS. 52A and 53 for improved visibility. The post 320 and additional details thereof are seen in FIG. 52B.

In FIGS. 51-53, the left side drivetrain and the right side drivetrain of the pan-tilt mechanism are identical. Given the symmetry of this design, statements made in reference to one side also apply to the other side. In this pan/tilt mechanism, both motors are used to produce the pan motion and the tilt motion. Compared to embodiments having a dedicated pan motor and a dedicated tilt motor, this special pan/tilt mechanism cleverly doubles the amount of torque for each motion, without upgrading to bigger or more powerful motors with higher torque outputs. Due to the design redundancy, the symmetrical drivetrains also provide practical benefits with respect to component part inventory and construction complexity.

The depicted pan/tilt mechanism comprises a plurality of components which form the two symmetrical drivetrains, including two reversible motors 334, two belts 336, two intermediary gears 338, two rotatable lower gears 340, two rotatable bevel gears 342, and a stationary bevel gear 344. In each drivetrain, the reversible motor 334 is preferably equipped with a drive shaft gear 335 which drivingly engages the toothed or timing belt 336. However, other configurations are possible such as a friction belt tensioned around pulleys. In the depicted embodiment, the belt 336 drives the intermediary gear 338, which in turn drives the lower gear 340. In particular, the intermediary gear 338 is provided as a double gear with two teeth sets: one set intermeshes with the belt 336 and the other set intermeshes with the lower gear 340. In other embodiments, the intermediary gear 338 is omitted and the belt 336 engages directly with the lower gear 340. In which case, the lower gear 340 may be provided as either a single or double gear. The lower gear 340, which is located in the internal component enclosure of the head portion 330, is drivingly connected to the bevel gear 342, which is located in the hollow interior of the post portion 320. The lower gear 340 and the bevel gear 342 are positionally fixed relative to one another and drivingly connected together in a shaft-locked manner. The gears 340, 342 are preferably axially aligned with the same axis of rotation. The two rotatable bevel gears 342 are in turn symmetrically mounted along the diameter of the stationary bevel gear 344. The gears 342, 344 are preferably axially aligned with an axis of rotation perpendicular to the center or long axis of the stationary bevel gear 344. Angled bevel gear pairs may also be used within the left-right symmetrical framework. The stationary bevel gear 344 is positionally fixed relative to the base portion 310.

The post portion 320 has a hollow interior with a transverse conduit 321 extending therethrough. The rotatable bevel gears 342 engage the stationary bevel gear 344 via the transverse conduit 321 on either side. The ends of the transverse conduit 321 are capped off by the support plates 358, which are fastened to the post portion 320 via fasteners 360 with interposed seals 323. The shaft structure 343 connecting the shaft-locked gears 340, 342 is rotatably mounted through the support plate 358 with bearing 359, and the motor cradle structure 362 is rotatably mounted to the support plate 358 with bearing 363 (see FIG. 52C). The gears 340, 342 are therefore rotatably mounted relative to the motor cradle structure 362. The reversible motors 334 are fixedly mounted to the motor cradle structure 362. The intermediary gear 338 is rotatably mounted on a fixed shaft which is mounted to the motor cradle structure 362 at shaft mount 365 (see FIG. 52C). In the depicted embodiment, the post portion 320 again comprises a neck structure 324 and a body structure 326, with the body structure 326 arranged above the neck structure 324 and extending laterally outward from the neck structure 324 to attach to the support plates 358. In this way, the neck structure 324 and the body structure 326 form a T shape similar to a PVC tee pipe fitting. The post portion 320 also comprises a vertical conduit 325 to accommodate the stationary bevel gear 344, bearings 348, and wave spring 349. The wave spring 349 supports the post portion 320 at a desired position and thus guards against resistance load conditions which would prevent pan motion of the post portion 320 relative to the base portion 310. Preferably, the stationary bevel gear 344 has the vertical conduit 346 extending therethrough for internal wiring. In which case, the vertical conduit 325 also extends through to the top and bottom sides of the post portion 320. In the depicted embodiment, the top end of the vertical conduit 325 is capped off by a separate cap piece 327 fastened to the body 326. The opening in the top of the post portion 320, in this case the cap piece 327, is provided with a rubber cable insert or grommet seal 418 for running cable wiring in a sealed manner. The post portion 320 also comprises a collar or shoulder structure 328 which interfaces with the base portion 310. The base portion 310 again carries the pan stop 318 which engages within the stop channel 322 formed on the bottom of the post portion 320.

Figure 54A:
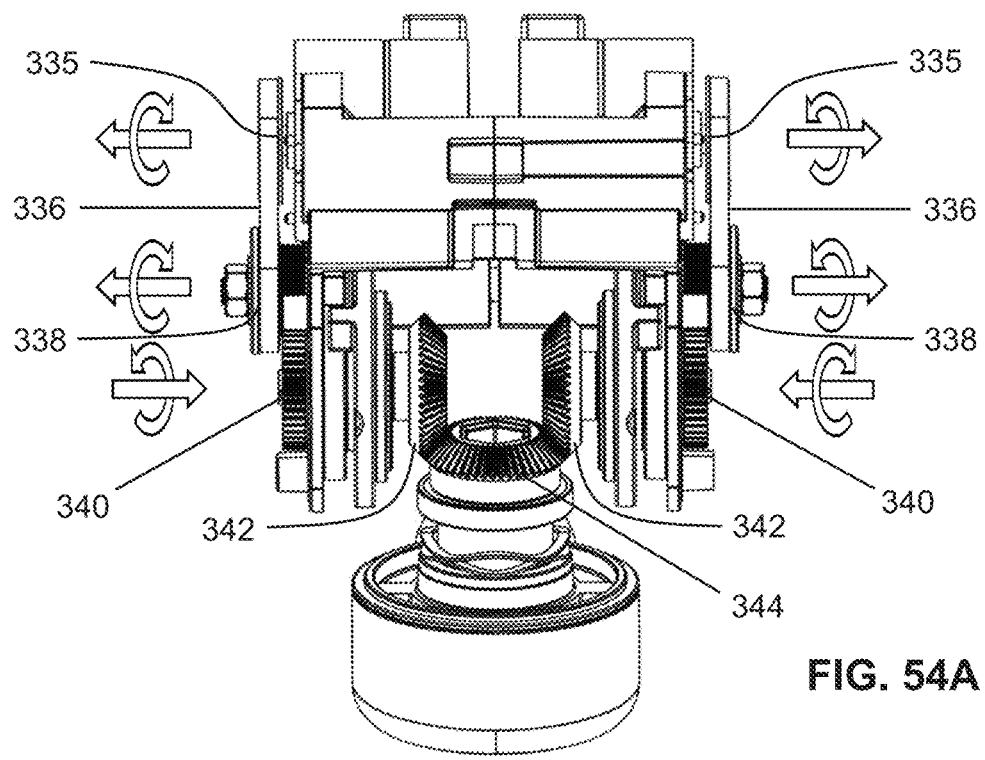
FIGS. 54A-54D show front perspective views of the searchlight assembly of FIG. 52A, with righthand rule arrows indicating torque direction of the components of the gear train transmission for a pan left motion (FIG. 54A), a pan right motion (FIG. 54B), a tilt down motion (FIG. 54C), and a tilt up motion (FIG. 54D)
Figure 54B:
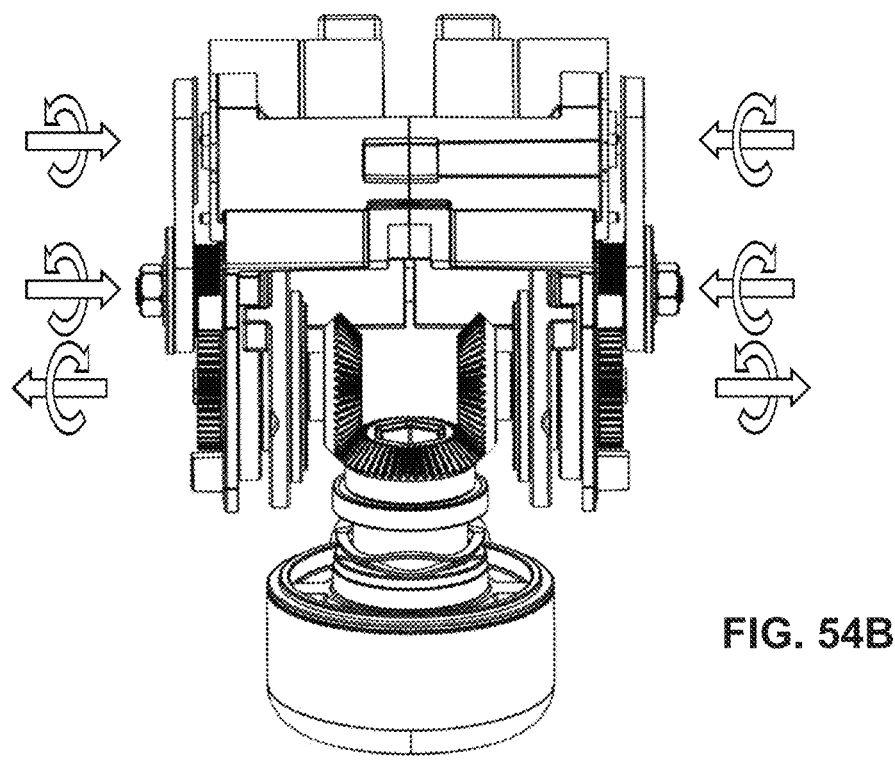
Figure 54C:
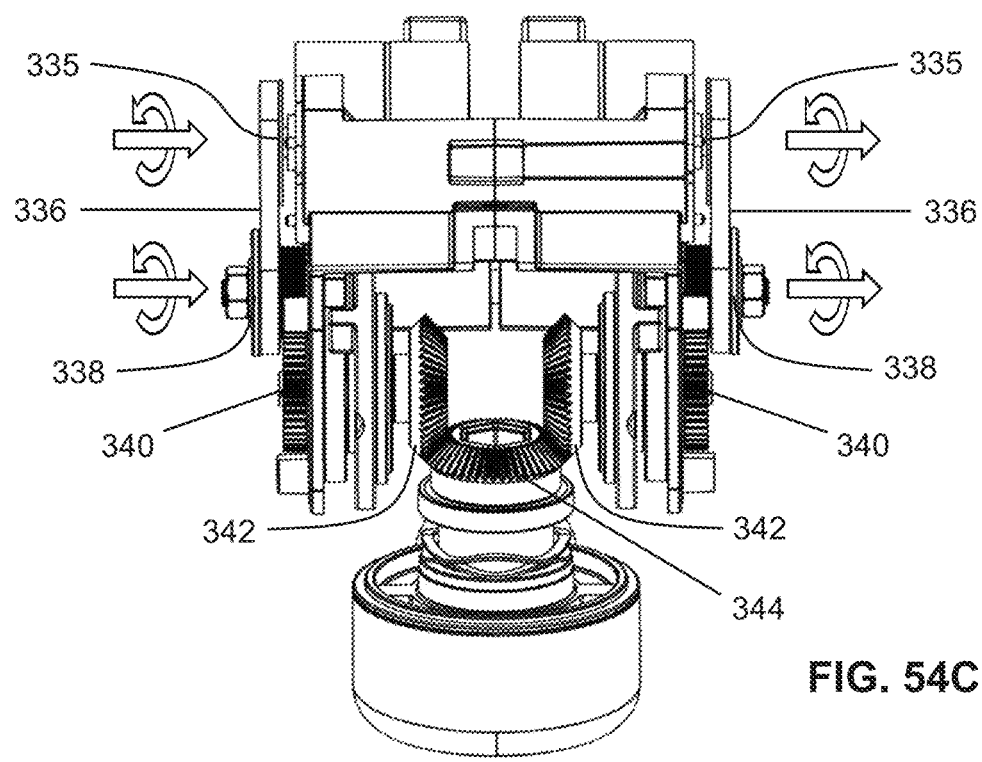
Figure 54D:
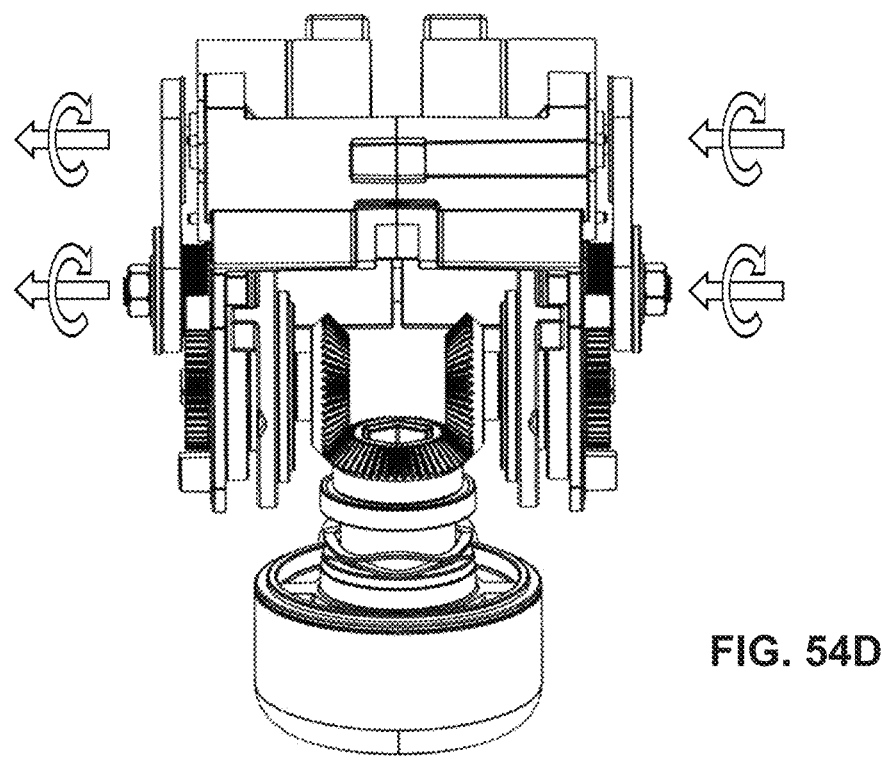
Figure 55A:
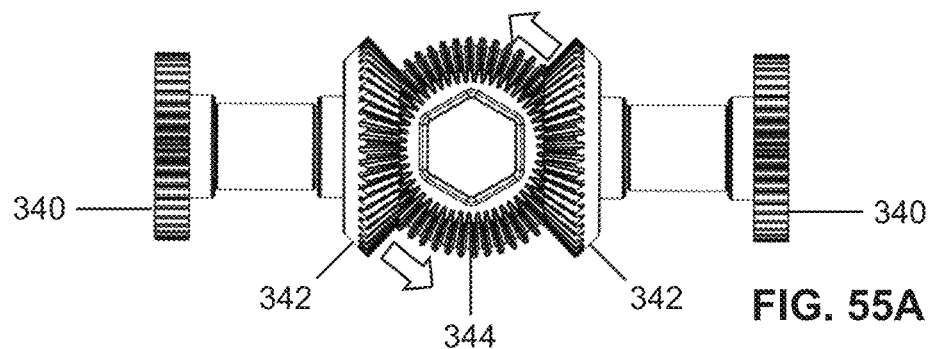
FIGS. 55A-55D show top views of the miter gears of FIG. 52A with directional arrows for the pan left motion (FIG. 55A), the pan right motion (FIG. 55B), the tilt down motion (FIG. 55C), and the tilt up motion (FIG. 55D)
Figure 55B:
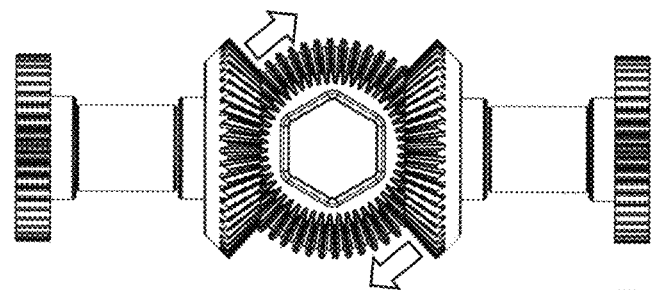
Figure 55C:
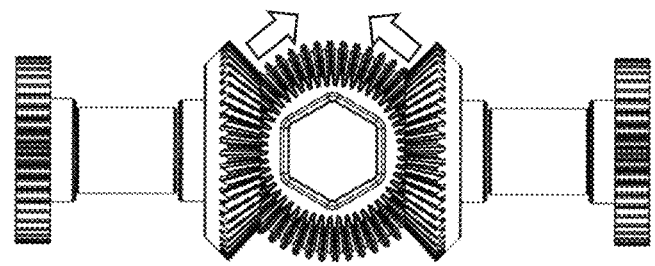
Figure 55D:
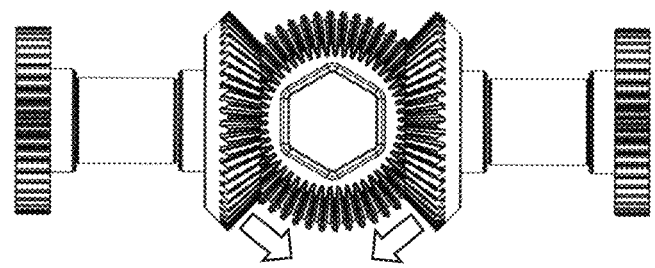

FIGS. 54 and 55 show the action of the components of the pan/tilt mechanism during pan left movement (FIGS. 54A and 55A), pan right movement (FIGS. 54B and 55B), tilt down movement (FIGS. 54C and 55C) and tilt up movement (FIGS. 54D and 55D). In FIG. 54, the rotational direction of the gears 335, 338, 340 is shown using right hand rule convention where the axial arrows indicate the orientation of the thumb pointing along the axis of rotation and the direction of rotation corresponds to the curl of the fingers. FIG. 55 shows the shaft-locked gears 340, 342 and the stationary gear 344 from above, where each arrow indicates the direction in which the respective gear 342 is being driven. By definition, the reversible motors 334 are bidirectional. The two operating directions are arbitrarily termed positive (P) and negative (N) here. The four combined motor states are then P/P, P/N, N/P, and N/N. The operating direction of the page-right motor 334 in FIG. 54A is arbitrarily designated as the positive direction. It should be appreciated that, since the motors 334 mounted on the motor cradle structure 362 oriented in opposite directions, both motors 334 are operating in the positive direction in FIG. 54A. If separately viewed from the side as in FIG. 53, it would be seen that both motors 334 are rotating counter-clockwise. In FIG. 54B, the motors 334 have switched operating directions and are thus operating in the negative direction. They would be seen rotating clockwise when viewed from either side. Accordingly, the motors 334 operate in the same direction (P/P or N/N) for pan motion, and the gears 342 are driven in the same direction around the fixed gear 344. From the perspective of FIGS. 55A and 55B, the gears 342 travel in the counterclockwise direction for the pan left movement and the clockwise direction for the pan right movement. In this way, the post portion 320 and head portion 330 rotate relative to the base portion 310. For tilt motion, the motors 334 operate in different directions from one another (P/N or N/P). The page-right motor 334 is operating in the positive direction in FIG. 54C for the tilt down movement and in the negative direction in FIG. 54D for the tilt up movement. The other motor 334 is therefore operating in the negative direction in FIG. 54C and in the positive direction in FIG. 54D. As seen in FIGS. 55C and 55D, the opposing driving forces transmitted to the gears 342 on the fixed gear 344 counteract and balance each other, such that the gears 342 remain stationary in the same position on the fixed gear 344. Due to the shaft-locked connection to the motionless gears 342, the gears 340 are also held motionless during the tilt motion. As a result, the torques output from the motors 334 driving the belt drive components causes the head portion 340 to rotate relative to the arrested gears 340. In the depicted embodiment, the gears 338 travel clockwise or counterclockwise around the arrested gears 340 for tilt motion. In this way, the head portion 330 pivots relative to the post portion 320 and base portion 310, without the post portion 320 rotating on the base portion 310.

Figure 35:
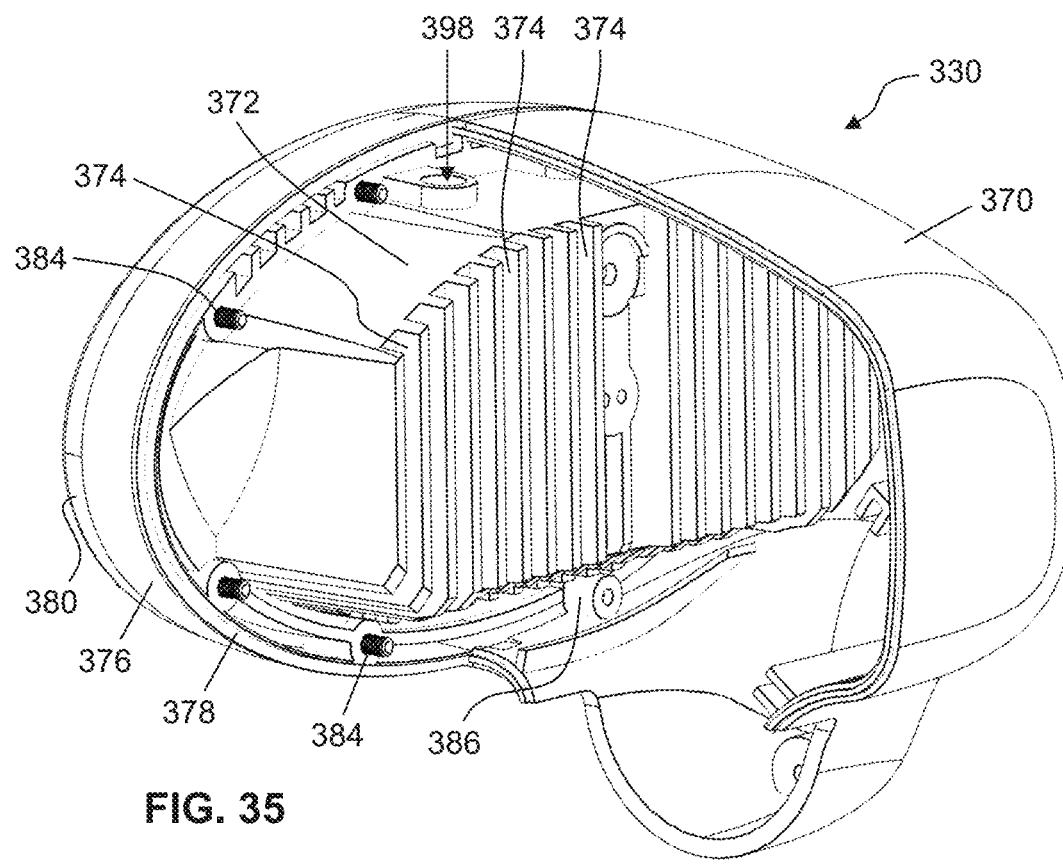
FIG. 35 shows a left side perspective view of the head of the searchlight assembly of FIG. 30 with the left housing shell and pan/tilt drive mechanism components omitted.
Figure 36:
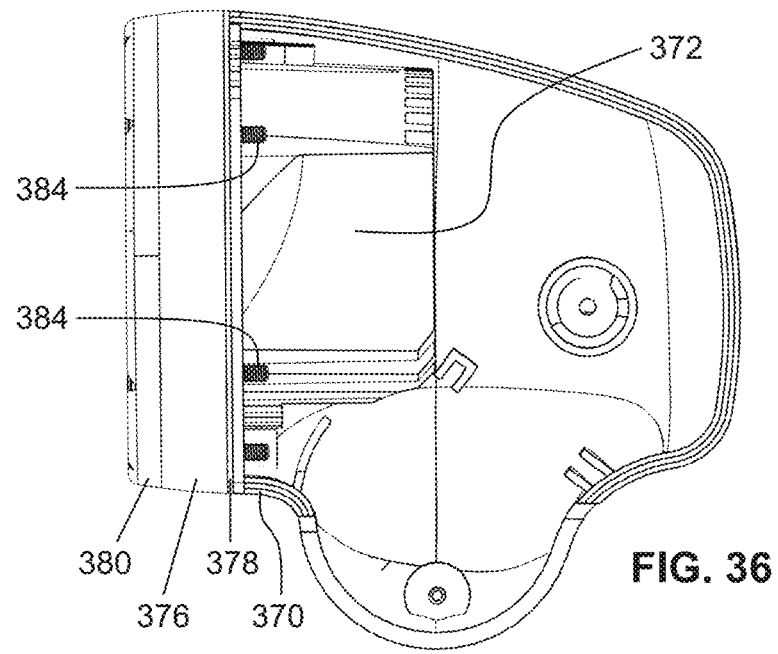
FIG. 36 shows a left side view of the head of FIG. 35.
Figure 37:
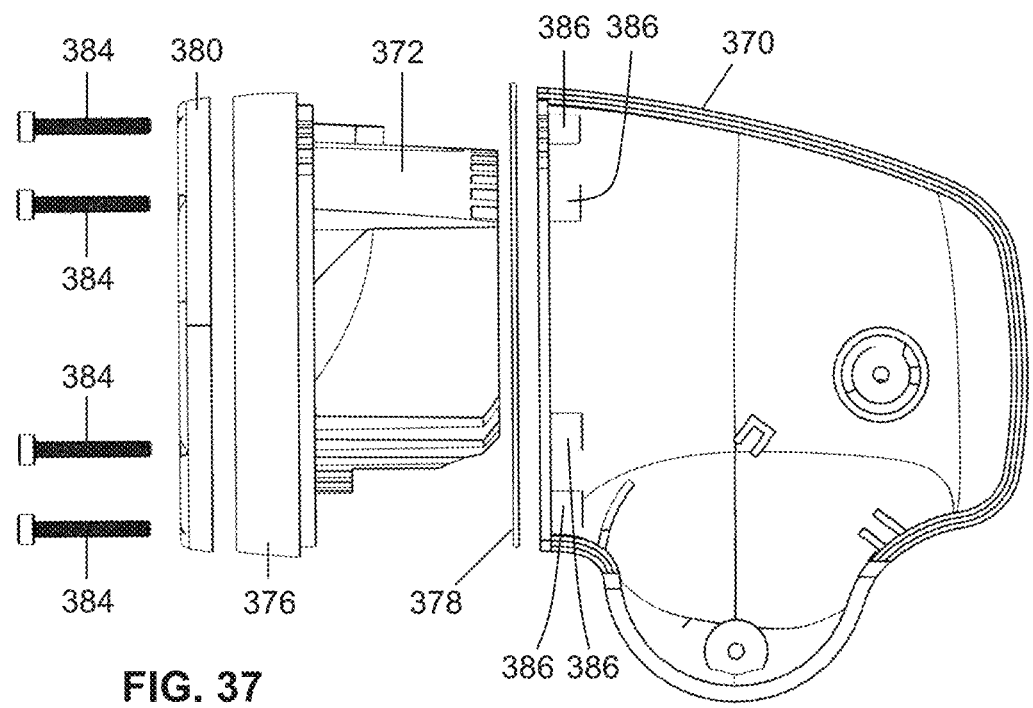
FIG. 37 shows an exploded view of the head of FIG. 36.
Figure 38:
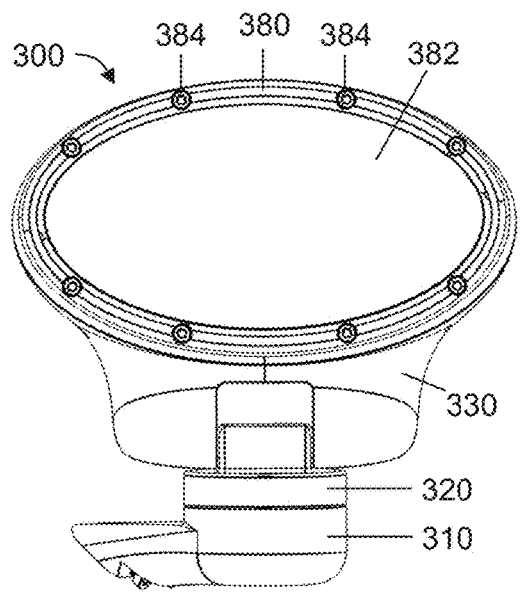
FIG. 38 shows a front side view of the searchlight assembly of FIG. 3.
Figure 39:
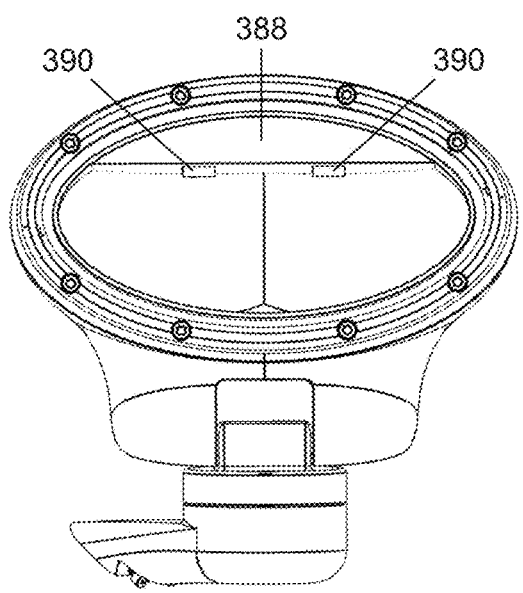
FIG. 39 shows the searchlight assembly of FIG. 38 with the outer lens cover omitted.
Figure 40:
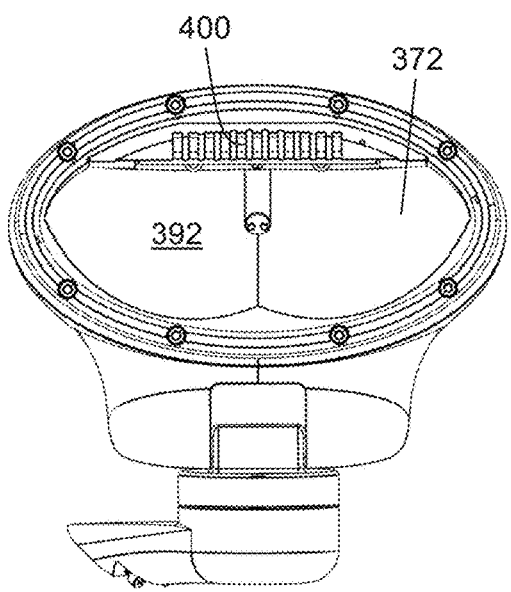
FIG. 40 shows the searchlight assembly of FIG. 39 with the reflector omitted.
Figure 41:
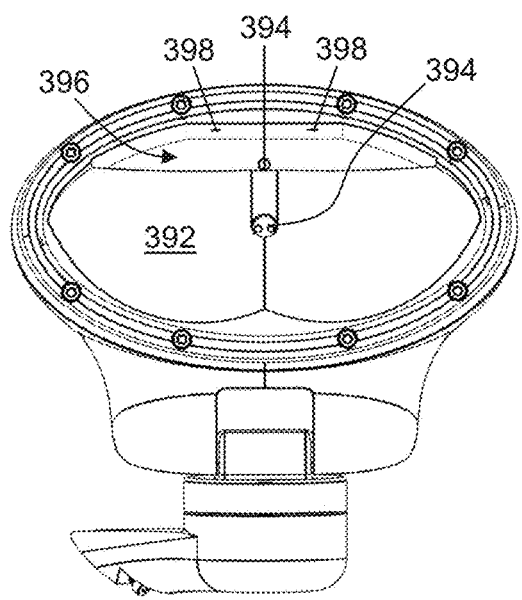
FIG. 41 shows the searchlight assembly of FIG. 40 with the LEDs and LED mounting bracket omitted.

Referring also now to FIGS. 35-37, the head 330 further comprises a heat sink 372. The heat sink 372 is made of a material with good heat-dissipation properties. For example, aluminum or other metals may be used. Those of skill in the art will understand that any material having similar heat-exchange properties could also be used. The heat sink 372 comprises cooling fins 374, which help dissipate heat, and a heat sink ring structure 376. The heat sink ring 376 forms a part of the exterior surface of the head 330 and is therefore exposed to the ambient environment, which promotes substantial heat dissipation between the head 330 and its outside surroundings. In the depicted embodiment, the heat sink ring 376 is integral with the remainder of the heat sink 372; the heat sink 372 with its fins 374 and ring 376 being formed from a single cast. In other embodiments, the heat sink ring 376 may be provided as a separate component which contacts the heat sink 372 to establish thermal communication therebetween, whereby heat from the heat sink 372 is transferred to the heat sink ring 376 and then dissipated to the exterior environment. A ring gasket 378 is provided between the heat sink ring 376 and the housing shells 370, which helps seal against the ingress of water and/or dirt into the interior of the head 330. On its other side, the heat sink ring 376 abuts a bezel 380. The bezel 380 holds the lens cover 382 (see also FIG. 38) in place which in turn supports the optical or sensor device system against the heat sink 372. For illustrative clarity, the lens cover 382 is depicted being opaque; it being understood that the lens cover 382 is transparent or at least partially translucent for purposes of light emission. For attachment, fasteners 384 are inserted through the bezel 380 (which provides the fastener head contact surface), through the heat sink 372 and anchored into bosses 386 of the housing shells 370.

Referring also now to FIGS. 38-41, one possible optical device configuration is described. Although the optical device of the depicted embodiment is an LED lamp, other optical or sensor systems (e.g. halogen or HID lamps, cameras, infrared sensors, heat sensors, etc.) may also be used according to the present disclosure. Indeed, one aspect of the searchlight system 100 is the modular exchange of different searchlight assemblies 300 with respect to an already-installed mounting assembly 200, including for the purpose of switching out different optical or sensor device systems as desired under the circumstances. Further, although the depicted optical device has a reflective design which utilizes a reflective surface to redirect and concentrate light emitted by one or more LEDs into an output beam, other embodiments comprise a refractive design which utilizes at least one projection lens to redirect and concentrate emitted light into an output beam. Some embodiments incorporate both reflective and refractive designs. A searchlight system according to the present disclosure and the various aspects thereof may be used with any suitable optical device system; no limitation is intended nor should be inferred.

In the depicted embodiment, a reflector 388 is provided under the lens cover 382. The surface of the reflector 388 is configured to redirect and concentrate light emitted through LED openings 390 in the reflector 388. The reflector 388 is positioned adjacent a front surface 392 of the heat sink 372 (opposite the fins 374). The geometry of the front surface 392 may correspond to the geometry of the reflector 388, as in the depicted embodiment, which helps to correctly align the reflector 388 between the heat sink 372 and the lens cover 382. As such, this front surface 392 generally defines the cavity 396 for accommodating optical device components. The front surface 392 includes apertures 394 for running wiring to the controller 332 within the head 330. The front surface 392 also has a further recessed cavity portion indicated by 396 which receives a LED mounting bracket 400. Bores 398 (see also FIG. 35) are provided in the upper portion of the cavity 396 to receive fasteners (not shown) for coupling the heat sink 372 to the mounting bracket 400.

Figure 42:
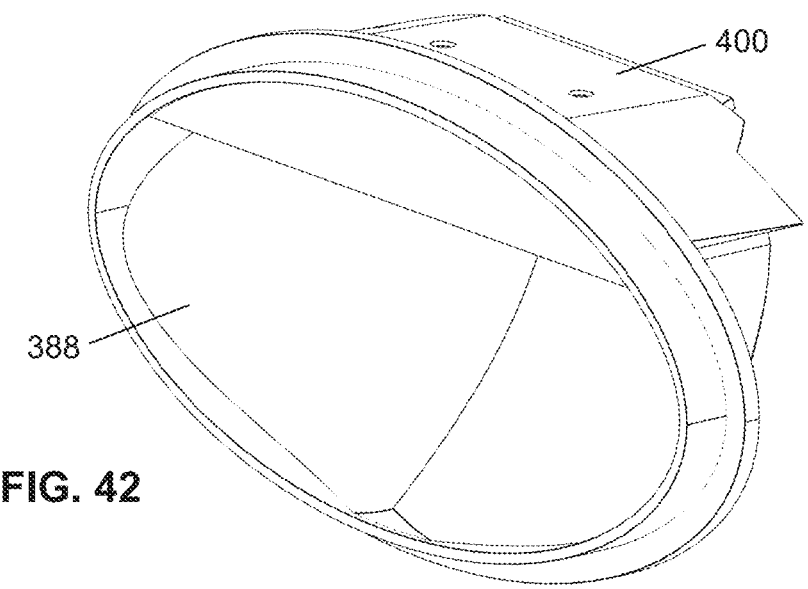
FIG. 42 shows a front perspective view of the reflector of FIG. 39 and LED mounting bracket of FIG. 40.
Figure 43:
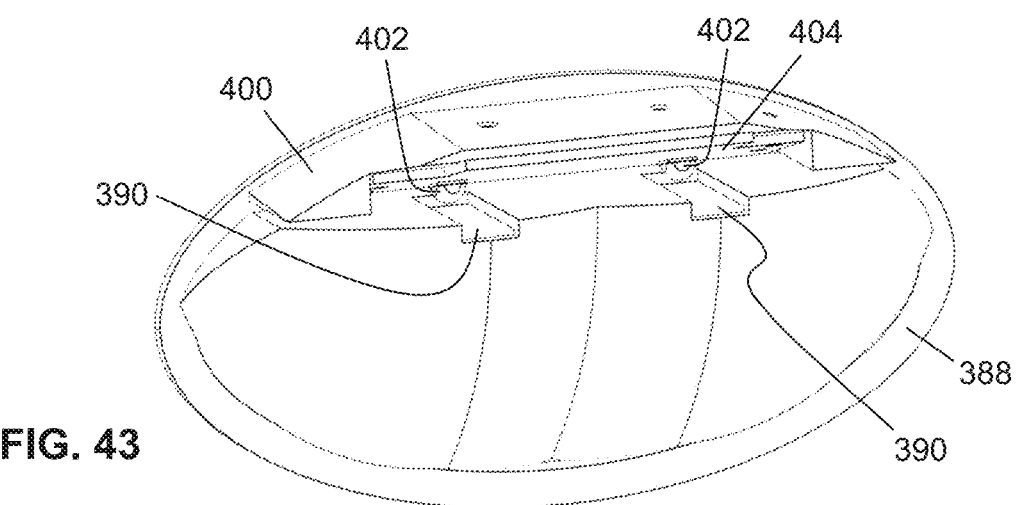
FIG. 43 shows a rear perspective view of the reflector and LED mounting bracket of FIG. 42 with LED circuit board and LEDs mounted to the mounting bracket.
Figure 44:
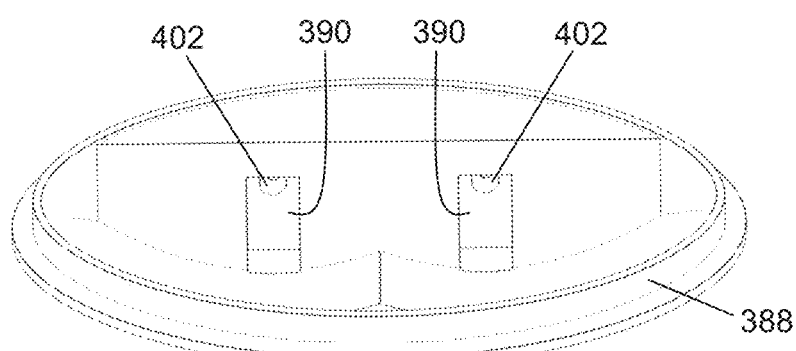
FIG. 44 shows a bottom front perspective view of the reflector and LED mounting bracket of FIG. 43.
Figure 45:
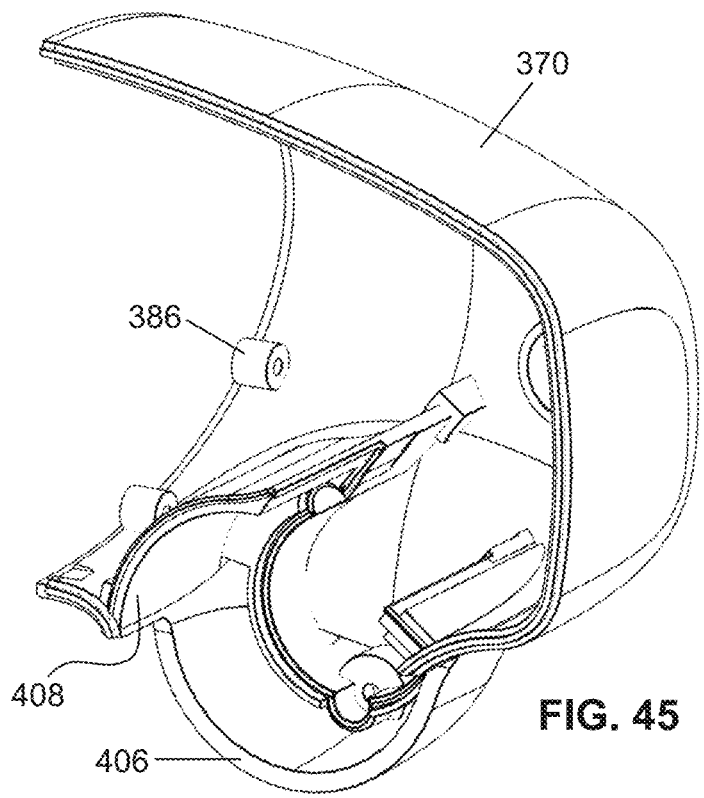
FIG. 45 shows a left side perspective view of a right housing shell with insert piece installed.
Figure 46:
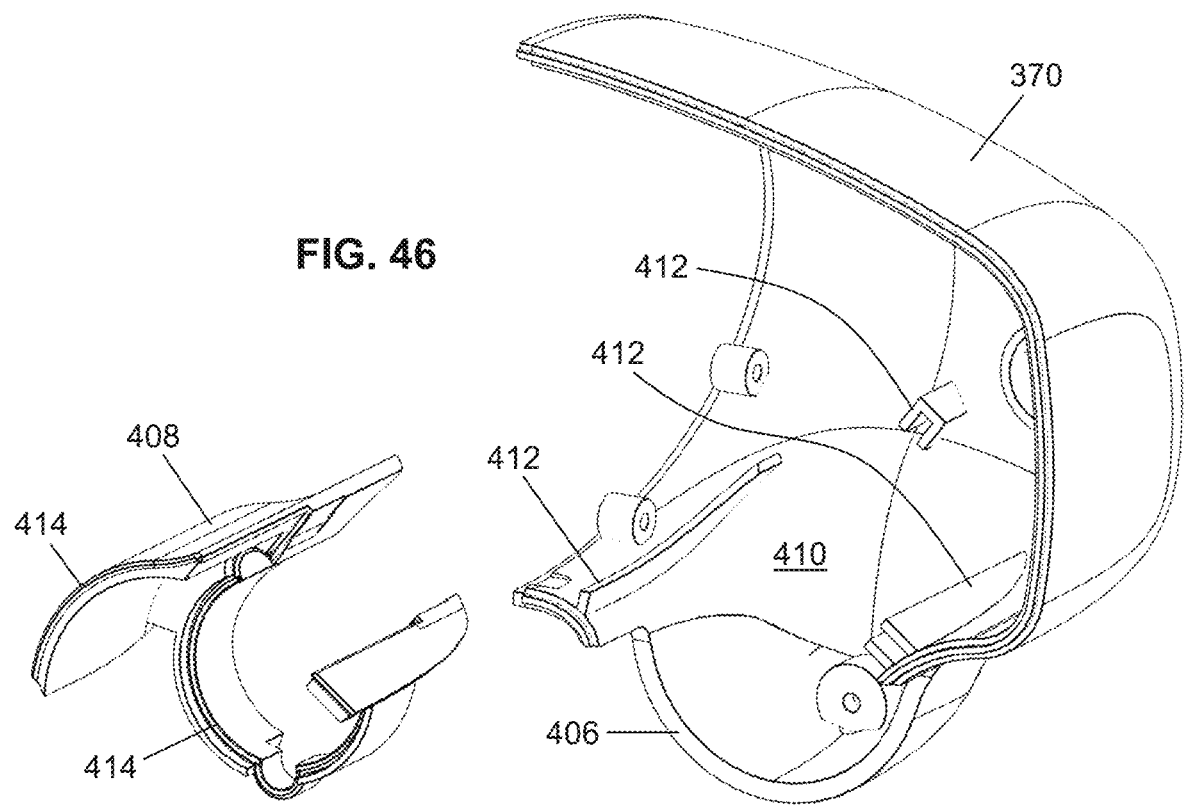
FIG. 46 shows the right housing shell and insert piece of FIG. 45 with the insert piece moved off to the left.
Figure 47:
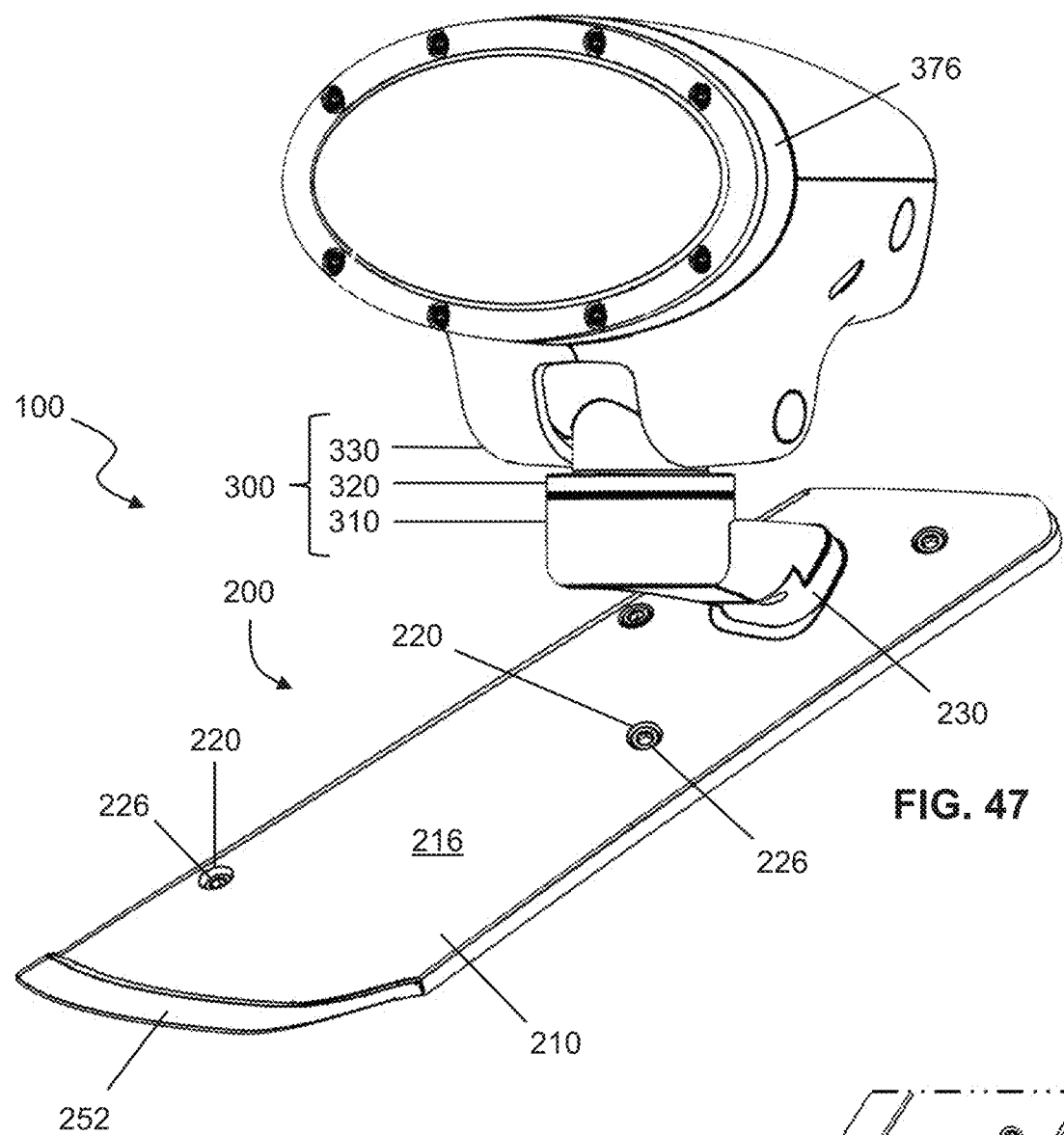
FIG. 47 shows a front perspective view of another searchlight system.
Figure 56:
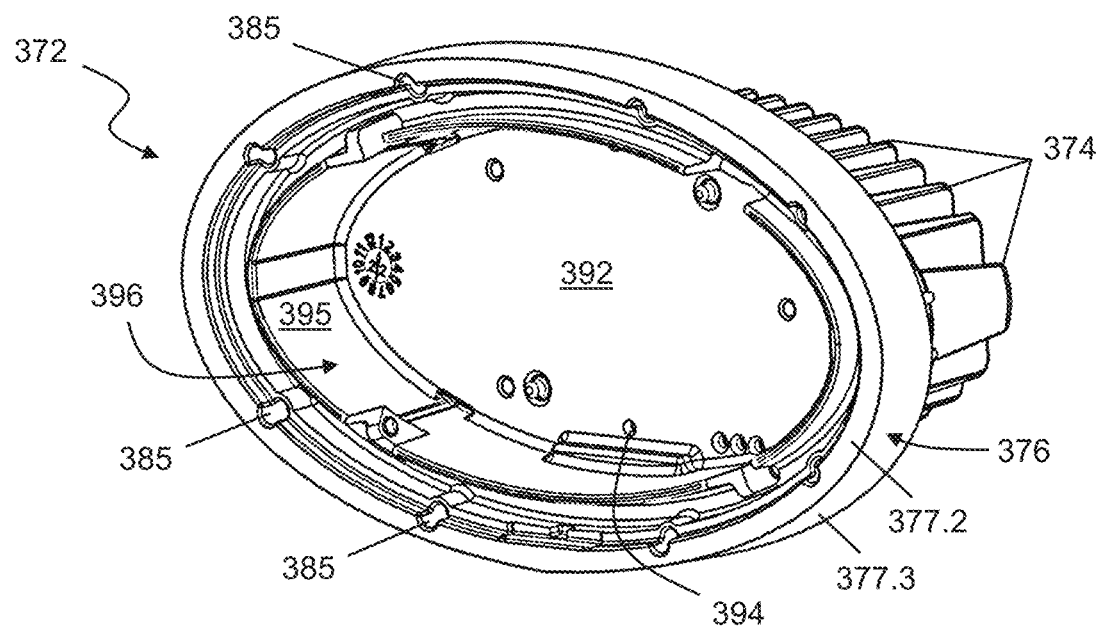
FIG. 56 shows a front side perspective view of another searchlight assembly heatsink.
Figure 57:
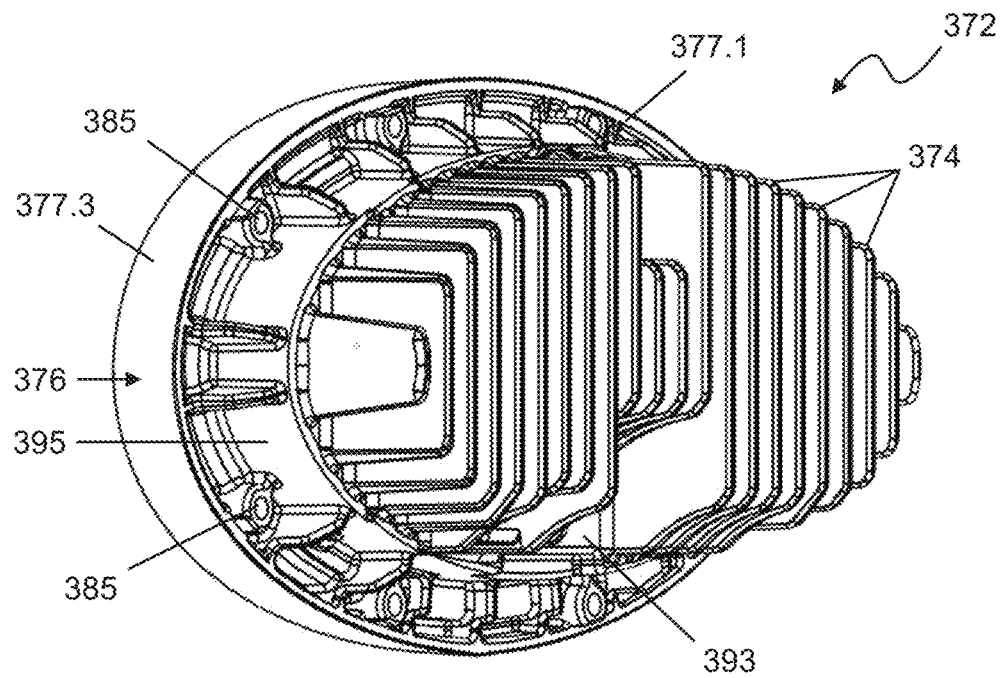
FIG. 57 shows a rear side perspective view of the heatsink of FIG. 56.

Referring also now to FIGS. 42-44, the LED mounting bracket 400 is arranged within the cavity 396 between the reflector 388 and the heat sink 372. The top surface of the mounting bracket 400 has anchor holes for mating with fasteners (not shown) which extend through the heat sink bores 398 in coupling the bracket 400 to the heat sink 372. LEDs 402 are provided on circuit board 404, which is mounted to the mounting bracket 400. The LEDs 402 are positioned to emit light through the reflector openings 390 onto the surface of the reflector 388, which may be configured to redirect and concentrate the light into a beam as in the depicted embodiment. In other embodiments, one or more LEDs 402 are positioned along the front surface 392 of the heat sink 372, and at least one projection lens (not shown) is arranged between the LEDs 402 and the lens cover 382, the at least one projection lens configured to redirect and concentrate light into a beam, in which case the front surface 392 of the heat sink 372 may be flat or take on different shapes and the reflector 388 omitted entirely. FIGS. 56-57 show such an example heat sink 372 with a flat front surface 392 for mounting multiple LEDs 402 beneath such a condenser lens, or other types of devices as desired.

Referring now to FIGS. 56-57, the above statements regarding the heat sink 372 of FIGS. 35-37 apply equally here, and vice versa, unless otherwise indicated. The heat sink ring structure 376 comprises a first or rear mating surface 377.1, a second or front mating surface 377.2, and an exterior or lateral surface 377.3 which extends between the two mating surfaces 377.1, 377.2 and faces outward away from the head portion 330. The ring gasket 378 is positioned between the rear mating surface 377.1 and a complimentary mating surface of the at least one housing shell 370 to form a waterproof seal therebetween (see also FIGS. 35-37). It should be appreciated that the ring gasket 378 is shaped according to the junction geometry and therefore would be elliptical rather than circular in this case. Seals are preferably also provided at interfaces between different housing shells 370. In this way, the one or more housing shells 370 and heat sink 378 form at least part of the enclosure for internal components of the head 330. On the bottom side, this enclosure is completed by the motor cradle structure 362 and housing insert pieces 406 discussed below. Accordingly, the exterior surface of the head portion 330, which is outermost surface exposed to the ambient environment and its elements, is formed at least in part by the heat sink ring 376, in particular the exterior surface 377.3 thereof, as well as the at least one housing shell 370. In this way, the heat sink ring 376 is in direct thermal communication with the outside environment. This clever design allows the heat sink 372 to efficiently dissipate heat from the head 330 to the surrounding environment. This is significant since the housing shells 370 are typically made from molded plastic, which as good insulators, would otherwise trap excess heat within the head 330. As discussed, the heat sink 372 is made from a thermally conductive material, such as aluminum for example, and preferably cast as a single integral piece. In this example, the heat sink 372 has a flat front surface 392. The cooling 374 are formed on the backside of the front surface 392 indicated by reference numeral 393. The front surface 392 is set back from the heat sink ring 376, and along with the sidewalls 395, defines the cavity 396 for accommodating the optical device components. The heat sink ring 376 is laterally offset from the sidewalls 395 and center region of the heatsink 370, which contains the heat fins 374, by a peripheral flange 397. The peripheral flange structure 397 is profiled on the front side for lens mounting and on the back side for reinforcement. Fastener openings 385, which receive the fasteners 384 for connecting the heat sink 372 and bezel 380 to the housing shells 370, are formed in this periphery flange portion 397 between the sidewalls 395 and the heat sink ring 376. When fastened together, the bezel 380 which abuts the mating surface 377.2 of the heat sink ring 372.

Figure 58:
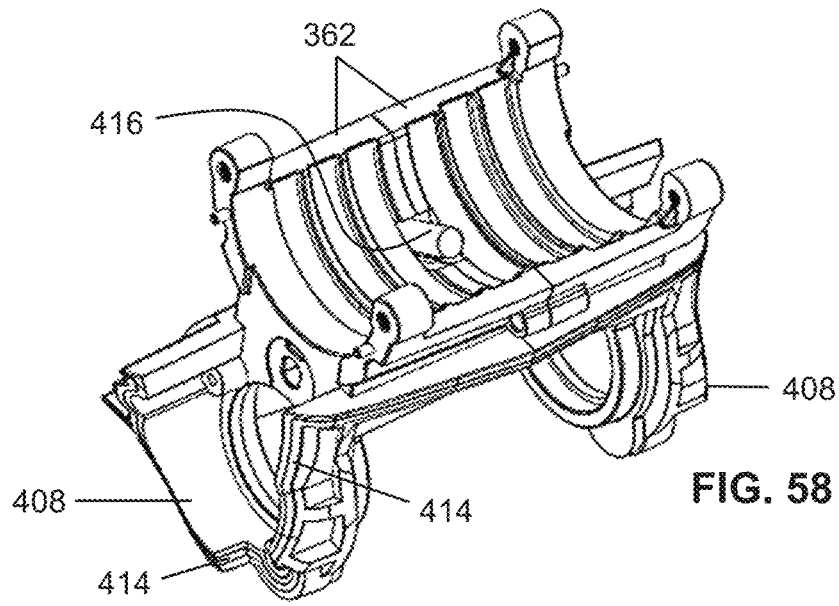
FIG. 58 shows a top rear perspective view of the motor cradle structures and insert piece structures with seals.
Figure 59:
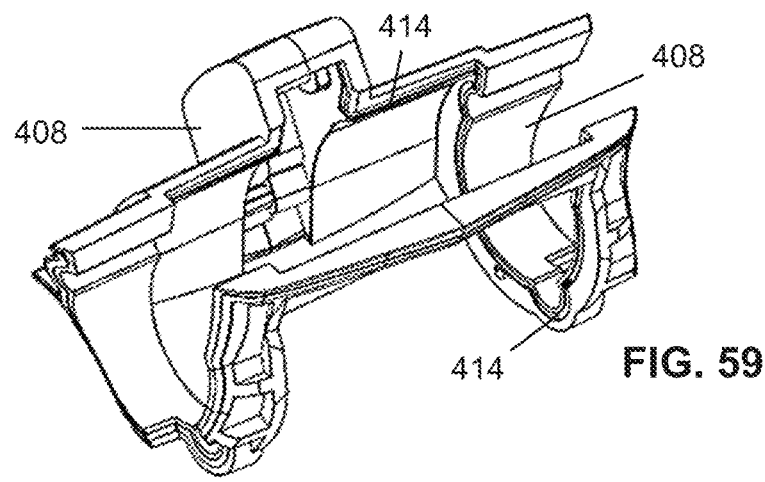
FIG. 59 shows the view of FIG. 58 with the motor cradle structures omitted.
Figure 60:
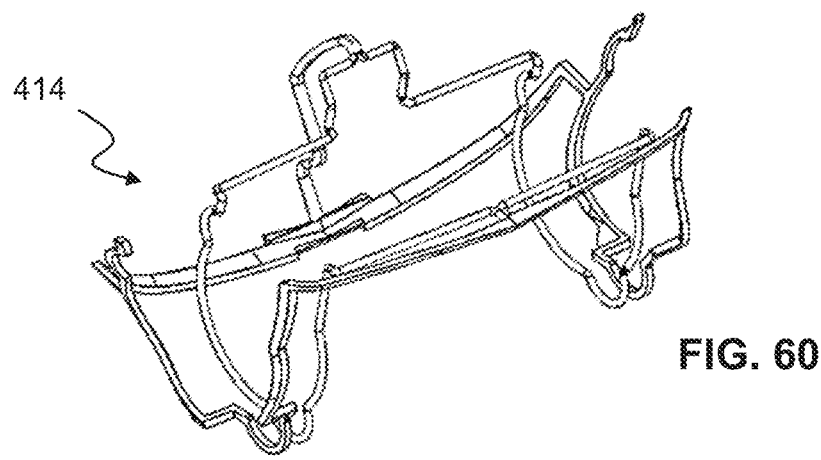
FIG. 60 shows the view of FIG. 59 with the insert piece structures omitted.

Reference is also now made to FIGS. 45-46 and 58-60. In the tilt mechanisms described above, the head 330 (including housing shells 370) rotates relative to both the stationary pivot post 320 and fixed support plates 358. Therefore, at least some clearance space is provided between a lower edge 406 of each housing shell 370 and the pivot post's neck 324 and body 326 (see FIG. 34) and the support plates 358 to accommodate this motion. However, water, dust and the like could potentially enter through such clearance space into the interior of the head 330 and negatively affect mechanical or electronic components. To mitigate against this problem, a special insert piece 408 is provided for each housing shell 370. Together with the housing shells 370 and cradles 362, the insert pieces 408 seal the area of the head 330 occupied by the pivot post 320 and support plates 358 from the rest of the interior of the head 330 containing parts that might be negatively affected by moisture/particle ingress. The internal surface 410 of each housing shell 370 comprises fitting projections 412 for positioning the insert piece 408 thereon. Sealant or adhesive is provided along the contact points between each housing shell 370 and its respective insert piece 408. In other embodiments (not shown), one or more rubber, elastomer or like seals may be provided along these contact points, for example positioned in grooves formed by the housing shell fittings 412. On the opposite interior-facing end of each insert piece 408, one or more rubber, elastomer or like seals 414 is/are provided along the contact points with the other insert piece 408 and the cradle 362. FIG. 58 shows the motor cradle structures 362 and special insert structures 408 with seals 414. FIG. 59 omits the motor cradle structures 362. FIG. 60 omits the special inserts 408 to show the system configuration of sealing structures. The interface or mating surfaces of the insert pieces 408 and the motor cradle structures 362 are provided with grooves 415 for the seals 414 (see FIG. 52C). Both surfaces may have complimentary grooves 415, or one surface may have a groove 415 with the other surface having no groove or having a complimentary protrusion pressing into the opposing groove 415. These grooves 415 can be used with either adhesive or compression (e.g. rubber) seals, or a combination of both adhesive and compression seals. It should be appreciated that there is another seal (not shown) along the midline between the two motor cradle structures 362. Preferably, a rubber cable insert or grommet seal 418 is positioned in the cable conduit of the motor cradle structure 362 as well as at the top of the pivot post 320 (see FIG. 52B). Since the geometry provided by the special insert pieces 408 is not integrated into the housing shells 370 themselves, the housing shells 370 may be readily produced by efficient processes such as injection molding.

While a number of aspects and embodiments have been discussed, those of skill in the art will recognize certain modifications, permutations, additions and sub-combinations are possible. It is intended that the following claims are interpreted to include all such modifications, permutations, additions and sub-combinations, as they are within the true spirit and scope of the present disclosure and the claims. Each embodiment described herein has numerous equivalents.

The terms and expressions which have been employed are used as terms of description and not of limitation, and there is no intention in the use of such terms and expressions to exclude any equivalents of the features shown and described or portions thereof, but it is recognized that various modifications are possible within the scope of the invention claimed. Accordingly, it should be understood that although the invention has been specifically disclosed by selected embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

| | |
|---|---|
| 5 | A-pillar |
| 10 | trim cover/exterior vehicle surface |
| 15 | base trim piece or tracking |
| 20 | surface openings |
| 25 | fasteners |
| 30 | A-pillar mating holes |
| 35 | base piece openings |
| 40 | trim cover fittings |
| 100 | mounted searchlight system |
| 200 | mounting assembly |
| 210 | upper bracket |
| 212 | lower bracket |
| 214 | interior bracket surface |
| 216 | exterior bracket surface |
| 218 | projection |
| 220 | bore |
| 222 | end wall |
| 224 | bore |
| 226 | fastener |
| 230 | adapter |
| 232 | adapter mounting collar |
| 234 | bracket opening |
| 236 | bracket interface surface |
| 238 | fasteners |
| 240 | first adapter projection |
| 242 | second adapter projection |
| 244 | fasteners |

-continued

LIST OF REFERENCE NUMERALS

| | |
|---|---|
| 246 | adapter internal conduit |
| 248 | adapter collar conduit |
| 250 | clip nuts |
| 252 | mounting gasket |
| 254 | rivet nuts |
| 256 | nut body |
| 258 | material bulge |
| 260 | top flange |
| 300 | searchlight assembly |
| 310 | support arm/base |
| 312 | projections |
| 314 | fastener mating bores |
| 316 | arm internal conduit |
| 317 | arm external aperture |
| 318 | pan stop |
| 320 | pivot post/yoke |
| 321 | transverse conduit |
| 322 | stop channel |
| 323 | pivot post seal |
| 324 | pivot post neck |
| 325 | vertical conduit |
| 326 | pivot post body |
| 327 | pivot post cap |
| 328 | pivot post collar |
| 330 | head |
| 332 | electronics controller |
| 334 | reversible motor |
| 335 | drive gear |
| 336 | belt |
| 338 | sprocket |
| 340 | gear |
| 342 | rotating bevel/miter gear |
| 343 | shaft |
| 344 | fixed bevel/miter gear |
| 346 | miter gear conduit |
| 348 | post bearings |
| 349 | post wave spring |
| 350 | tilt reversible motor |
| 352 | tilt belt |
| 354 | tilt sprocket |
| 356 | tilt fixed gear |
| 358 | support plates |
| 359 | plate-shaft bearings |
| 360 | fasteners |
| 362 | cradle |
| 364 | motor caps |
| 366 | fasteners |
| 368 | tilt stop |
| 370 | housing shell |
| 372 | heat sink |
| 374 | cooling fins |
| 376 | heat sink ring |
| 377 | heat sink ring surfaces |
| 378 | heat sink ring gasket |
| 380 | bezel |
| 382 | lens cover |
| 384 | fasteners |
| 385 | fastener openings |
| 386 | housing bosses |
| 388 | reflector |
| 390 | LED reflector openings |
| 392 | heat sink front surface |
| 393 | heat sink rear surface |
| 394 | heat sink apertures |
| 395 | heat sink sidewall |
| 396 | heat sink cavity |
| 397 | heat sink peripheral flange |
| 398 | heat sink bores |
| 400 | LED mounting bracket |
| 402 | LEDs |
| 404 | LED circuit board |
| 406 | housing edge |
| 408 | insert piece |
| 410 | internal housing surface |
| 412 | insert piece fittings |
| 414 | seals |
| 415 | grooves |

-continued

LIST OF REFERENCE NUMERALS

| | |
|---|---|
| 416 | cable |
| 418 | cable seal |

The invention claimed is:

1. A searchlight assembly comprising:
a base portion,
a post portion rotatably mounted to the base portion, the post portion having a hollow interior with a transverse conduit extending therethrough,
a head portion pivotably mounted to the post portion opposite the base portion, the head portion having an optical device, and
a pan/tilt mechanism comprising a plurality of components including two reversible motors, two belts, two rotatable lower gears, two rotatable bevel gears, and a stationary bevel gear, with the plurality of components forming two symmetrical drivetrains of the pan/tilt mechanism,
wherein, in each drivetrain of the two symmetrical drivetrains, a respective reversible motor is drivingly connected to a respective belt, the belt is drivingly connected to a respective lower gear, the lower gear is drivingly connected to and positionally fixed relative to a respective rotatable bevel gear, and the rotatable bevel gear is drivingly connected to the stationary bevel gear,
wherein the reversible motors are fixedly mounted to the head portion, and the lower gears are rotatably mounted relative to the head portion,
wherein the stationary bevel gear is located in the hollow interior of the post portion and positionally fixed relative to the base portion, and the rotatable bevel gears engage the stationary bevel gear via the transverse conduit of the post portion,
wherein for pan motion, the rotatable bevel gears are driven in the same rotational direction around the stationary bevel gear, such that the post portion and head portion rotate relative to the base portion, and
wherein for tilt motion, the rotatable bevel gears are held motionless on the stationary bevel gear due to counteracting torques applied to the rotatable bevel gears, such that the head portion pivots relative to the post portion and the base portion.

2. The searchlight assembly of claim 1, wherein the pan/tilt mechanism further comprises two intermediary gears, and in each drivetrain of the two symmetrical drivetrains, a respective intermediary gear is drivingly engaged between the belt and the lower gear.

3. The searchlight assembly of claim 2, wherein the belts are toothed belts which intermesh with drive shaft gears of the reversible motors, and wherein the intermediary gears are double gears which intermesh with the toothed belts and with the lower gears.

4. The searchlight assembly of claim 1, wherein the belts are toothed belts which intermesh with the lower gears and with drive shaft gears of the reversible motors.

5. The searchlight assembly of claim 1, wherein the rotatable bevel gears have an axis of rotation which is perpendicular to a center axis of the stationary bevel gear.

6. The searchlight assembly of claim 1, wherein the head portion contains a motor cradle structure, the reversible motors are fixedly mounted to the motor cradle structure, and the lower gears and the rotatable bevel gears are rotatably mounted relative to the motor cradle structure.

7. The searchlight assembly of claim 6, wherein the motor cradle structure is pivotably mounted to the post portion at either end of the transverse conduit, with the motor cradle structure positioned between the lower gears and the rotatable bevel gears.

8. The searchlight assembly of claim 1, wherein the post portion comprises a neck structure and a body structure which form a T shape.

9. The searchlight assembly of claim 1, wherein the post portion comprises a vertical conduit extending therethrough, and the stationary bevel gear has a vertical conduit extending therethrough for wiring.

10. The searchlight mounting system of claim 1, wherein the optical device is an LED lamp, halogen lamp, HID lamp, camera, infrared sensor, or heat sensor.

11. The searchlight assembly of claim 1, wherein the base portion is a support arm for mounting to a vehicle pillar.

12. A searchlight mounting system comprising a searchlight assembly according to claim 11, and a mounting assembly which comprises:
 a bracket having an interior surface configured to face toward a vehicle surface, an exterior surface opposite the interior surface, and fastener openings which extend through the bracket, wherein the fastener openings are provided as counterbores or countersinks each having a first bore diameter and a second bore diameter, and wherein the first bore diameter is formed into the exterior surface and larger than the second bore diameter,
 an adapter projecting out from the exterior surface of the bracket, the adapter configured to attach to the searchlight assembly, and
 fasteners for mounting the bracket to the vehicle surface via the fastener openings, each fastener having a head and a shank, wherein a diameter of the head diameter is smaller than the first bore diameter but larger than the second bore diameter, and wherein a diameter of the shank is smaller than the second bore diameter.

13. The searchlight mounting system of claim 12, wherein the mounting assembly further comprises threaded rivet nuts for installing into openings formed in the vehicle surface to receive the fasteners.

14. The searchlight mounting system of claim 13, wherein the adapter and the support arm comprise complimentary projections configured to form a dovetail joint.

15. The searchlight mounting system of claim 14, wherein the projections of the adapter and the support arm are arranged such that the searchlight assembly is slid downwardly onto the adapter to form the dovetail joint.

* * * * *